(12) United States Patent
Doernhoefer et al.

(10) Patent No.: US 11,535,017 B2
(45) Date of Patent: Dec. 27, 2022

(54) DIELECTRIC COMPOSITE WITH REINFORCED ELASTOMER AND INTEGRATE ELECTRODE

(71) Applicant: W. L. Gore & Associates GmbH, Putzbrunn (DE)

(72) Inventors: Andrea Doernhoefer, Hoehenkirchen (DE); Michael Rittmann, Putzbrunn (DE); Klaus Seibert, Emmendingen (DE); Alexander Zaggi, Aying (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 74 days.

(21) Appl. No.: 16/498,177

(22) PCT Filed: Apr. 4, 2018

(86) PCT No.: PCT/EP2018/058643
§ 371 (c)(1),
(2) Date: Sep. 26, 2019

(87) PCT Pub. No.: WO2018/185183
PCT Pub. Date: Oct. 11, 2018

(65) Prior Publication Data
US 2020/0039200 A1 Feb. 6, 2020

Related U.S. Application Data

(60) Provisional application No. 62/481,188, filed on Apr. 4, 2017.

(51) Int. Cl.
*B32B 27/32* (2006.01)
*B32B 5/16* (2006.01)
(Continued)

(52) U.S. Cl.
CPC .............. *B32B 27/322* (2013.01); *B32B 5/16* (2013.01); *B32B 15/06* (2013.01); *B32B 15/20* (2013.01);
(Continued)

(58) Field of Classification Search
CPC ......... B32B 27/322; B32B 5/16; B32B 15/06; B32B 15/20; B32B 25/08; B32B 25/12; B32B 2307/204
See application file for complete search history.

(56) References Cited

U.S. PATENT DOCUMENTS

| 3,864,124 A | 2/1975 | Breton et al. |
| 4,602,678 A | 7/1986 | Fick |

(Continued)

FOREIGN PATENT DOCUMENTS

| CA | 2900130 A1 | 10/2015 |
| CN | 102604282 A | 7/2012 |

(Continued)

OTHER PUBLICATIONS

Ahn et al, "Omnidirectional Printing of Flexible, Stretchable, and Spannin Silver Microelectrodes" Science, vol. 323 pp. 1590-1593 (Mar. 20, 2009).

(Continued)

*Primary Examiner* — Hai Vo
(74) *Attorney, Agent, or Firm* — Greenberg Traurig, LLP

(57) ABSTRACT

The present disclosure is directed to dielectric elastomeric composites that include a retainable processing membrane, an elastomer material, and an electrically conductive material. The elastomer layer may be partially imbibed into the retainable processing membrane. The retainable processing membrane may be porous. The retainable processing membrane is compacted in the transverse in direction, machine direction, or in both directions prior to the application of an (Continued)

elastomer material and an electrically conductive material. The compaction of the retainable processing membrane may form structured folds or folded fibrils in the membrane, giving the retainable processing membrane a low modulus and flexibility. In some embodiments, the dielectric composites are positioned in a stacked configuration. Alternatively, the dielectric elastomeric composites may have a wound configuration. The dielectric composites have a total thickness less than about 170 μm. The dielectric elastomeric composites may be used, for example, in dielectric elastomer actuators, sensors, and in energy harvesting.

8 Claims, 20 Drawing Sheets

(51) Int. Cl.
| | |
|---|---|
| B32B 15/06 | (2006.01) |
| B32B 15/20 | (2006.01) |
| B32B 25/08 | (2006.01) |
| B32B 25/12 | (2006.01) |
| B32B 25/18 | (2006.01) |
| B32B 25/20 | (2006.01) |
| B32B 27/40 | (2006.01) |

(52) U.S. Cl.
CPC .............. *B32B 25/08* (2013.01); *B32B 25/12* (2013.01); *B32B 25/18* (2013.01); *B32B 25/20* (2013.01); *B32B 27/40* (2013.01); *B32B 2250/03* (2013.01); *B32B 2264/105* (2013.01); *B32B 2264/108* (2013.01); *B32B 2307/202* (2013.01); *B32B 2307/204* (2013.01); *B32B 2307/732* (2013.01); *B32B 2457/00* (2013.01)

(56) References Cited

U.S. PATENT DOCUMENTS

| | | | |
|---|---|---|---|
| 4,720,400 A | 1/1988 | Manniso | |
| 4,877,661 A * | 10/1989 | House | B29C 55/005 |
| | | | 428/34.9 |
| 4,985,296 A | 1/1991 | Mortimer | |
| 5,026,513 A | 6/1991 | House et al. | |
| 5,087,641 A | 2/1992 | Sato | |
| 5,141,972 A | 8/1992 | Sato | |
| 5,148,806 A | 9/1992 | Fukui et al. | |
| 5,188,890 A | 2/1993 | Ohashi et al. | |
| 5,190,813 A | 3/1993 | Ohashi et al. | |
| 5,227,230 A | 7/1993 | McGlade | |
| 5,498,467 A | 3/1996 | Meola | |
| 5,506,047 A | 4/1996 | Hedrick et al. | |
| 5,524,908 A | 6/1996 | Reis | |
| 5,527,569 A | 6/1996 | Hobson et al. | |
| 5,545,473 A | 8/1996 | Ameen et al. | |
| 5,547,551 A | 8/1996 | Bahar et al. | |
| 5,547,911 A | 8/1996 | Grot | |
| 5,560,986 A | 10/1996 | Mortimer | |
| 5,591,034 A * | 1/1997 | Ameen | H01L 23/3737 |
| | | | 257/E23.107 |
| 5,766,979 A * | 6/1998 | Budnaitis | H01L 23/49827 |
| | | | 438/15 |
| 5,789,783 A * | 8/1998 | Choudhury | H01L 23/60 |
| | | | 257/773 |
| 5,846,355 A * | 12/1998 | Spencer | H01B 7/292 |
| | | | 156/53 |
| 5,879,794 A | 3/1999 | Korleski | |
| 5,885,738 A | 3/1999 | Hannon | |
| 5,891,402 A | 4/1999 | Sassa et al. | |
| 5,904,978 A | 5/1999 | Hanrahan et al. | |
| 5,945,217 A | 8/1999 | Hanrahan | |
| 6,016,848 A | 1/2000 | Egres | |
| 6,210,789 B1 | 4/2001 | Hanrahan | |
| 6,242,135 B1 | 6/2001 | Mushiake | |
| 6,379,745 B1 | 4/2002 | Kydd et al. | |
| 6,635,384 B2 | 10/2003 | Bahar et al. | |
| 6,737,158 B1 | 5/2004 | Thompson | |
| 7,147,378 B2 | 12/2006 | Chu et al. | |
| 7,518,284 B2 | 4/2009 | Benslimane et al. | |
| 7,678,701 B2 | 3/2010 | Tredwell et al. | |
| 7,789,908 B2 | 9/2010 | Sowinski et al. | |
| 7,931,995 B2 | 4/2011 | Bahar et al. | |
| 8,278,757 B2 | 10/2012 | Crain et al. | |
| 8,851,294 B2 | 10/2014 | Freese | |
| 8,951,628 B2 | 2/2015 | Burger et al. | |
| 8,974,739 B2 | 3/2015 | Yoshida | |
| 9,018,264 B2 | 4/2015 | Freese | |
| 9,288,903 B2 | 3/2016 | Hasegawa et al. | |
| 9,381,262 B2 | 7/2016 | Stephens et al. | |
| 9,573,339 B2 | 2/2017 | Hodgins et al. | |
| 2003/0113604 A1 | 6/2003 | Bahar et al. | |
| 2003/0211264 A1 | 11/2003 | Farnsworth et al. | |
| 2004/0087402 A1 | 4/2004 | Bahar et al. | |
| 2004/0084304 A1 * | 5/2004 | Thompson | F41H 5/0471 |
| | | | 204/296 |
| 2007/0259427 A1 | 11/2007 | Storey et al. | |
| 2008/0305250 A1 | 12/2008 | Yang et al. | |
| 2009/0008431 A1 * | 1/2009 | Zonvide | H05K 9/0015 |
| | | | 228/179.1 |
| 2009/0227165 A1 | 9/2009 | Imai | |
| 2011/0167547 A1 | 7/2011 | Jain | |
| 2013/0035685 A1 | 2/2013 | Chu et al. | |
| 2013/0183515 A1 * | 7/2013 | White | B29C 55/005 |
| | | | 428/297.4 |
| 2013/0210302 A1 | 8/2013 | Freese et al. | |
| 2013/0224472 A1 | 8/2013 | Freese et al. | |
| 2013/0236730 A1 | 9/2013 | Bose et al. | |
| 2014/0199904 A1 | 7/2014 | Creasy, Jr. et al. | |
| 2015/0002577 A1 | 1/2015 | Taya et al. | |
| 2015/0202577 A1 | 7/2015 | Freese et al. | |
| 2015/0315347 A1 | 11/2015 | Koellnberger et al. | |
| 2015/0315352 A1 | 11/2015 | Freese et al. | |
| 2015/0321162 A1 | 11/2015 | Brodoceanu et al. | |
| 2016/0167291 A1 | 6/2016 | Zagl et al. | |
| 2016/0204338 A1 | 7/2016 | Schmeer et al. | |

FOREIGN PATENT DOCUMENTS

| | | |
|---|---|---|
| CN | 106149206 A | 11/2016 |
| EP | 0160439 B1 | 6/1991 |
| EP | 0248617 B1 | 4/1993 |
| EP | 0526556 B1 | 8/1998 |
| GB | 1409229 | 10/1975 |
| GB | 2262101 A1 | 6/1993 |
| JP | S62100539 A | 5/1987 |
| JP | 2008113544 | 5/2008 |
| JP | 2008251833 | 10/2008 |
| JP | 2008277729 | 11/2008 |
| JP | 2012065426 | 3/2012 |
| JP | 2013201798 | 10/2013 |
| JP | 2014515704 | 7/2014 |
| JP | 2016505693 | 2/2016 |
| WO | 9703812 A1 | 2/1997 |
| WO | 20060127946 A1 | 11/2003 |
| WO | 2004005413 A1 | 1/2004 |
| WO | 2014032963 A1 | 3/2014 |
| WO | WO2014119166 | 8/2014 |
| WO | 2016135138 A1 | 9/2016 |
| WO | 2017086583 A1 | 5/2017 |

OTHER PUBLICATIONS

Caswell et al, "Wearable Electronics Reliability Issues and Real Life Solutions in Printed Electronics", DFR Solutions p. 1-58 (Jul. 30, 2015).

Dupont, "Printed Wearables—Electronic Inks for the Wearable World" Welcome to The Global Collaboratory (2014).

Hong et al. "Omnidirectionally Stretchable and Transparent Graphene Electrodes" ACS Nano, vol. 10 pp. 9446-9455 (2016).

(56) References Cited

OTHER PUBLICATIONS

Hong et al. Highly Stretchable and Transparent Metal Nanowire Heater for Wearable Electronic Applications Adv Materials vol. 27, p. 4744-4751 (2015).
Hu et al. "Inkjet Printing of Nanoporous Gold Electrode Arrays on Cellulose Membranes for High-Sensitive Paper-Like Electrochemical Oxygen Sensors Using Ionic Liquid Electrolytes" (Anal. Chem., 84:3745-3750 (2012).
Jeong et al. "Solderable and electroplatable flexible electronic circuit on a porous stretchable elastomer" (Nature Communications., DOI: 10.1038/ncomms1980, (2012).
Subramani et al., "Enhanced Electroactive Response of Unidirectional Elastomeric Composites with High-Dielectric-Constant Fibers" Advanced Materials, vol. 26, No. 18, May 1, 2014 pp. 2949-2953, XP055479769.
Lacour et al. "Stretchable gold conductors on elastometric substrates" Applied Physics Letter, vol. 82, No. 15, ( Apr. 14, 2003).
Lim et al. "Surface Treatments for Inkjet Printing onto a PTFE-Based Substrate for High Frequency Applications" (Ind. Eng. Chem. Res., 52:11564-11574 (2013).
Merilampi et al. "The Characterization of Electrically Conductive Silver Ink Patterns on Flexible Substrates" Microelectronics Reliability, 49: 782-790 (2009).
Paiz and Elmer, "Adhesion of continuous Ink Jet Inks on PTFE" (Wire and Cable Technology International—May/Jun. 2013).
Park et al. "Design of conductive composite elastomers for stretchable electronics" (Nano Today, 9:244-260 (2014).
Pu et al. Highly Stretchable Microsupercapacitor Arrays with Honeycomb Structures for Integrated Wearable Electronic Systems (ACS Nano, 10:9306-9315 (2016).
Rogers et al, "Materials and Mechanics for Stretchable Electronics" Science 327:1603-1607 (2010).
Vuorinen et al. "Inkjet-Printed Graphene/PEDOT PSS Temperature Sensors on a Skin-Conformable Polyurethane Substrate" (Scientific Reports, DOI: 10.1038/srep35289 (Oct. 2016).
Yao and Zhu, "Nanomaterial-Enabled Stretchable Conductors" Strategies, Materials and Devices Adv. Mater., DOI: 10.1002/adma.201404446, (2015).
Yetison et al., "Nanotechnology in Textiles" ACS Nano, 10:3042-3068 (2016).
Lotz, Peter, Dissertation "Dielectric Elastomer Stacking Actuators for a Peristaltic Fluid Delivery System" Department of Electrical Engineering and Information Technology of the Technical University of Darmstadt, Oct. 5, 2009, pp. 1-153.

\* cited by examiner

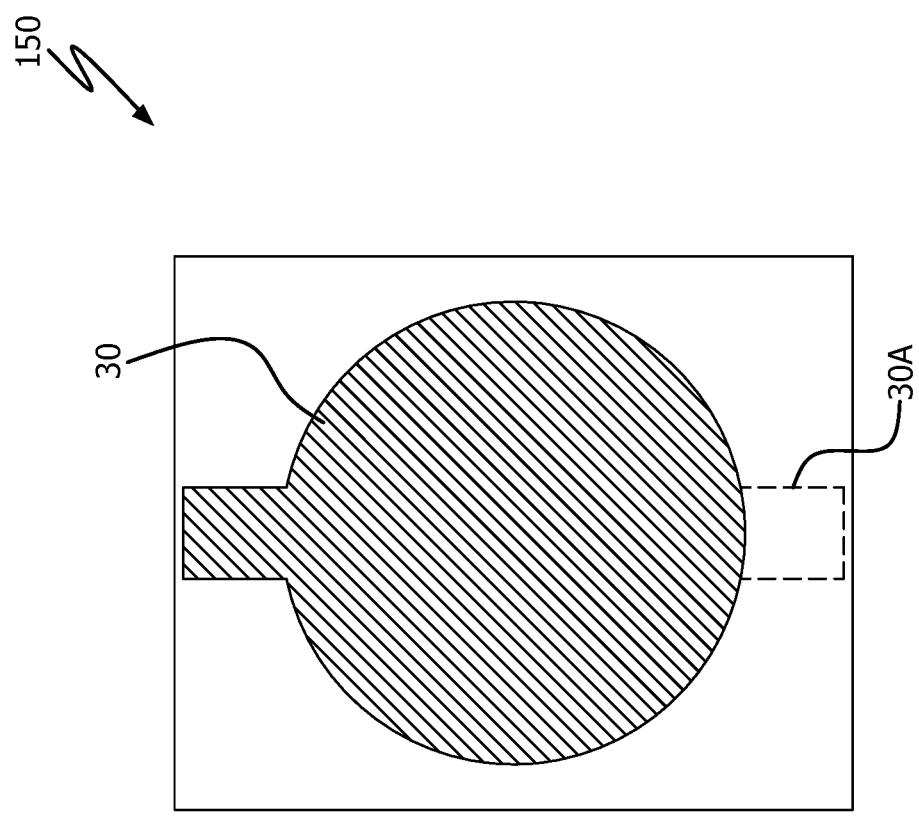

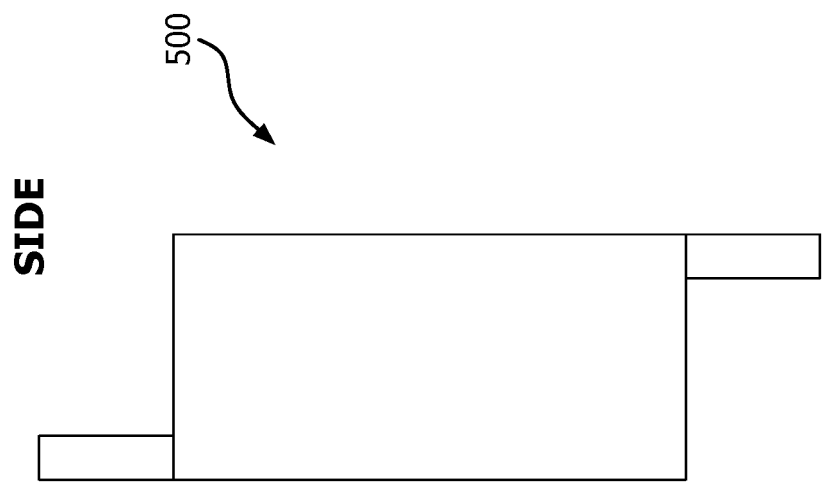
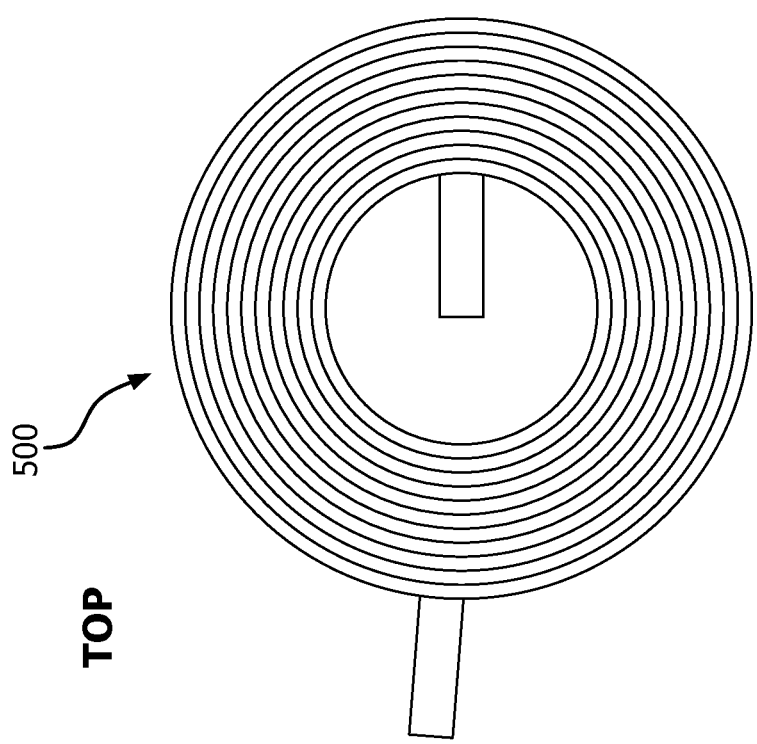
FIG. 14

US 11,535,017 B2

DIELECTRIC COMPOSITE WITH REINFORCED ELASTOMER AND INTEGRATE ELECTRODE

FIELD

The present disclosure relates generally to dielectric composites, and more specifically, to a dielectric elastomeric composite that has an integrated electrode, an elastomer material, and a retainable processing layer.

BACKGROUND

Dielectric elastomeric actuators (DEAs) have potential in a variety of applications. However, technical challenges remain that need to be overcome before reliable products can be commercially produced. One challenge is to produce thin elastomeric films (e.g., 100 µm thickness or less) for DEA applications where voltages are driven significantly lower than 2000 volts, or even lower than 600 volts. In order to achieve such voltages, elastomeric films with thicknesses lower than 50 µm need to be made reliably, without defects, and be able to be handled downstream. Such elastomers are typically difficult to manufacture and not easy to handle in roll-to-roll processing. As such, these materials may require the use of less desirable batch processing techniques.

There remains a need for a dielectric elastomeric composite that is thin, strong, and suitable for production using techniques associated with continuous roll-to-roll processing.

SUMMARY

One embodiment relates to a dielectric elastomeric composite that includes a compacted porous membrane, an elastomer material that at least partially penetrates the compacted porous membrane, and an electrically conductive material that is positioned on the elastomer material. The dielectric composite has a thickness that is less than about 170 µm. In some embodiments, the compacted porous membrane may be transversely compacted, compacted in the machine direction, or compacted in both directions, either sequentially or simultaneously. In exemplary embodiments, the compacted porous membrane is a compacted fluoropolymer membrane (e.g., a compacted expanded polytetrafluoroethylene membrane). The elastomer material may have a thickness from about 0.1 µm to about 100 µm, the electrically conductive material may have a thickness from about 1 nm to about 20 µm, and the compacted porous membrane may have a thickness from about 0.1 µm to about 50 µm. In some embodiments, the dielectric composite may have a stacked or a wound configuration.

Another embodiment relates to a dielectric elastomeric composite that includes a compacted porous membrane, an electrically conductive material positioned on the compacted porous membrane, and an elastomer material. The elastomer material encompasses the electrically conductive material and at least partially penetrates the compacted porous membrane. The compacted porous membrane may be a compacted fluoropolymer membrane. The porous membrane may be transversely compacted, compacted in the machine direction, or compacted in both directions, either sequentially or simultaneously. In some embodiments, the compacted porous membrane is a compacted expanded polytetrafluoroethylene membrane. The elastomer material may have a thickness from about 0.1 µm to about 100 µm, the electrically conductive material may have a thickness from about 1 nm to about 20 µm, and the compacted porous membrane may have a thickness from about 0.1 µm to about 50 µm. The dielectric composite may have a thickness that is less than about 170 µm. In some embodiments, the dielectric composite may have a stacked or a wound configuration.

A further embodiment relates to a dielectric elastomeric composite that includes a first elastomer material, a second elastomer material, and a compacted porous membrane sandwiched therebetween. A first electrically conductive material and a second electrically conductive material are positioned on the first and second elastomer material, respectively. The compacted porous membrane may be a compacted fluoropolymer membrane. In some embodiments, the compacted porous membrane is a compacted expanded polytetrafluoroethylene membrane. The compacted porous membrane may be transversely compacted, compacted in the machine direction, or compacted in both directions, either sequentially or simultaneously. The first and second elastomer materials may each have a thickness from about 0.1 µm to about 100 µm, the first and second electrically conductive materials may each have a thickness from about 1 nm to about 20 µm, and the compacted porous membrane may have a thickness from about 0.1 µm to about 50 µm. The dielectric elastomeric composite may have a thickness that is less than about 170 µm.

Another embodiment relates to a method of making a dielectric elastomeric composite that includes compacting a porous membrane, applying a first elastomer material to a first side of the compacted porous membrane, applying a second elastomer material to a second side of the compacted porous membrane, positioning a first electrically conductive material on the first elastomer material and positioning a second electrically conductive material on the second elastomer material opposing the compacted porous membrane. The compacted porous membrane may be transversely compacted, compacted in the machine direction, or compacted in both directions, either sequentially or simultaneously. The compacted porous membrane may be a compacted fluoropolymer membrane. In some embodiments, the compacted porous membrane is a compacted expanded polytetrafluoroethylene membrane. The first and second elastomer materials may each have a thickness from about 0.1 µm to about 100 µm, the first and second electrically conductive materials may each have a thickness from about 1 nm to about 20 µm, and the compacted porous membrane may have a thickness from about 0.1 µm to about 50 µm. The dielectric composite may have a thickness that is less than about 170 µm.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 2B is schematic illustration of the top view of the dielectric composite of FIG. 1 depicting the pattern of the electrically conductive material according to at least one embodiment;

FIG. 14 is a schematic illustration of the top view and cross-section of a wrapped composite tube according to at least one embodiment;

DETAILED DESCRIPTION

Figure 1:
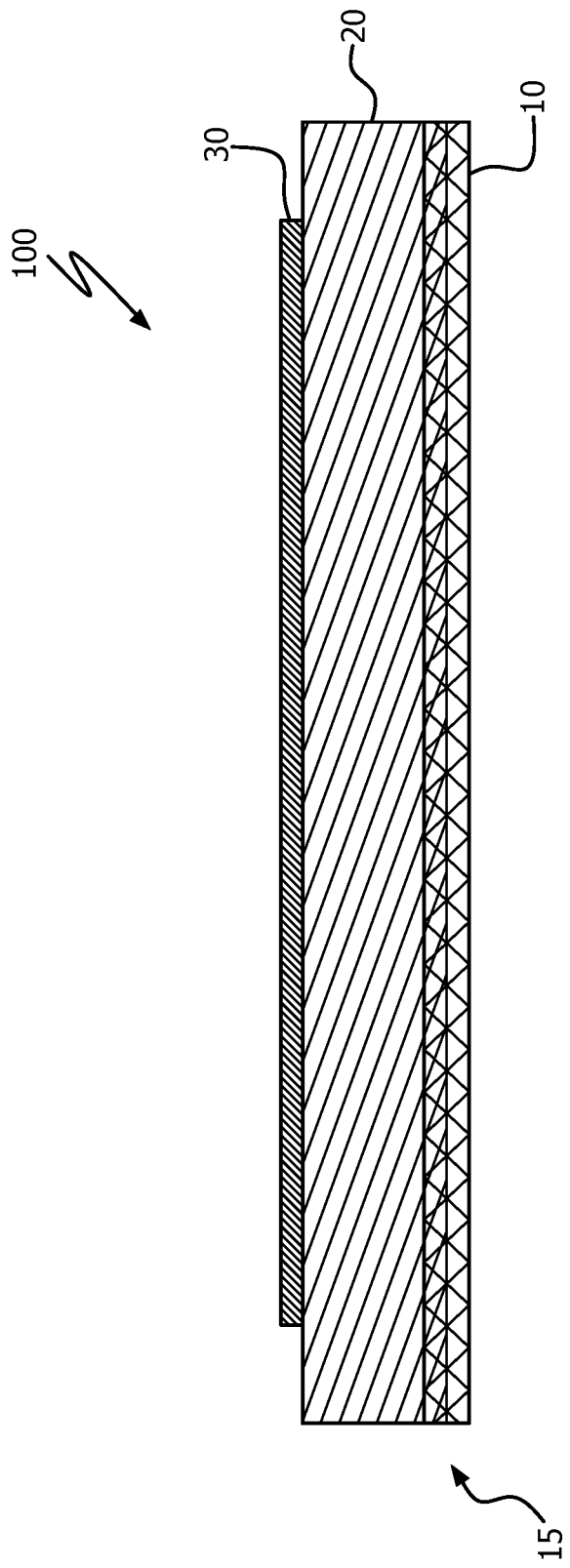
FIG. 1 is a schematic illustration of the cross-section of a dielectric composite that includes a retainable processing layer, an elastomer layer, and an electrically conductive layer positioned on the elastomer according to at least one embodiment.

Persons skilled in the art will readily appreciate that various aspects of the present disclosure can be realized by any number of methods and apparatus configured to perform the intended functions. It should also be noted that the accompanying figures referred to herein are not necessarily drawn to scale, and may be exaggerated to illustrate various aspects of the present disclosure, and in that regard, the figures should not be construed as limiting. The terms "compacted porous membrane" and "retainable processing membrane" may be used interchangeably herein. In addition, the terms "dielectric elastomeric composite" and "dielectric composite" may be interchangeably used herein.

The present invention is directed to dielectric elastomeric composites that include a retainable processing membrane, an elastomer material, and an electrically conductive material. The elastomer material may be partially or fully penetrated into the retainable processing membrane. In exemplary embodiments, the retainable processing membrane is porous. In some embodiments, the dielectric composites may be positioned in a stacked configuration to form a multilayer stack actuator. Alternatively, the dielectric composites may have a wound configuration. The dielectric elastomeric composites may have a total thickness of less than about 170 µm, less than about 150 µm, less than about 125 µm, less than about 100 µm, less than about 50 µm, less than about 40 µm, less than about 40 µm, less than about 30 µm, less than about 25 µm, less than about 20 µm, less than about 15 µm, less than about 10 µm, or less than about 5 µm.

As discussed above, the dielectric composite may include a retainable processing membrane, an electrically conductive material, and an elastomer layer. In the embodiments discussed herein, the retainable processing membrane may have a thickness from about 0.1 µm to about 50 µm, from about 0.1 µm to about 40 µm, from about 0.1 µm to about 30 µm, from about 0.1 µm to about 25 µm, from about 0.1 µm to about 15 µm, or from about 0.1 µm to about 10 µm. Advantageously, the retainable processing membrane is retained in the end product without limiting actuation performance of the dielectric elastomeric composite. The retainable processing membrane also reduces the risk of the dielectric composite thinning and cracking due to overtensioning or creep during use. As a result, the retainable processing membrane increases both the integrity and the lifetime of the dielectric elastomeric composite. In addition, the retainable processing membrane may provide an increased actuation in low modulus direction when showing anisotropic material properties. Further, the retainable processing membrane has a lower tear resistance and increased sensitivity for sensors due to an anisotropic behavior.

In the embodiments described herein, the retainable processing membrane is compacted in one or more of the transverse direction or machine direction prior to the application of an elastomer material or an electrically conductive material. It is to be understood that the compaction is not limited to one direction, it may be done in the transverse direction, machine direction, or in both directions, either sequentially or simultaneously. In one exemplary embodiment, the retainable processing membrane is compacted in the transverse direction prior to the application of an elastomer and an electrically conductive material. The retainable processing membrane during compaction forms macrostructured folds and/or micro-folded fibrils in the membrane, giving the retainable processing membrane low modulus and flexibility. The compacted retainable processing membrane (e.g., compacted porous membrane) may also or alternatively demonstrate out-of-plane geometries such as wrinkles or folds in the membrane, such as, but not limited to, the methods described in EP3061598 A1 to Zaggl et al. and U.S. Pat. No. 9,849,629 to Zaggl, et al. Additionally, the compaction of the retainable processing membrane increases the density of the membrane, which results in a reduction in the inner pore volume. It is to be noted that heat shrinkage or solvent shrinkage or other suitable method may alternatively be used to non-mechanically "compact" the retainable processing membrane. Because the retainable processing membrane is not removed prior to use, the strength provided by the retainable processing membrane allows for planar processing for a multilayer stack actuator or for roll-to-roll processing. The retainable processing membrane may have a modulus from about 0.2 MPa to 5 MPa in the compacted direction and greater than about 5 MPa in the non-compacted direction.

In at least one embodiment, the retainable processing membrane is a porous fluoropolymer membrane. In at least one exemplary embodiment, the retainable processing (fluoropolymer) membrane is a polytetrafluoroethylene (PTFE) membrane or an expanded polytetrafluoroethylene (ePTFE) membrane. Expanded polytetrafluoroethylene (ePTFE) membranes prepared in accordance with the methods described in U.S. Pat. No. 7,306,729 to Bacino et al., U.S. Pat. No. 3,953,566 to Gore, U.S. Pat. No. 5,476,589 to Bacino, or U.S. Pat. No. 5,183,545 to Branca et al. may be used herein.

It is to be understood that throughout the application, the term "PTFE" is utilized herein for convenience and is meant to include not only polytetrafluoroethylene, but also expanded PTFE, expanded modified PTFE, and expanded copolymers of PTFE, such as described in U.S. Pat. No. 5,708,044 to Branca, U.S. Pat. No. 6,541,589 to Baillie, U.S. Pat. No. 7,531,611 to Sabol et al., U.S. Pat. No. 8,637,144 to Ford, and U.S. Pat. No. 9,139,669 to Xu et al.

The porous fluoropolymer membrane may also include a polymer material that includes a functional tetrafluoroethylene (TFE) copolymer material where the functional TFE copolymer material includes a functional copolymer of TFE and PSVE (perfluorosulfonyl vinyl ether), or TFE with another suitable functional monomer, such as, but not limited to, vinylidene fluoride (VDF), vinyl acetate, or vinyl alcohol. A functional TFE copolymer material may be prepared, for example, according to the methods described in U.S. Pat. No. 9,139,707 to Xu et al. or U.S. Pat. No. 8,658,707 to Xu et al.

In other embodiments, the retainable processing membrane may include, but is not limited to, expanded polyethylene membranes, porous polypropylene membranes, and electrospun nanofiber membranes.

As discussed above, the dielectric composite also includes an electrically conductive material. The electrically conductive material includes, but is not limited to, electrically conductive metals (e.g., aluminum, silver, and platinum), electrically conductive polymers, electrically conductive inks, and fine powders of conductive materials (e.g., nanoparticles of graphite or carbon black). The electrically conductive material may be applied to the retainable processing membrane or elastomer layer by known deposition and coating methods. Non-limiting examples include quenched thermal evaporation, vapor deposition, spray coating, slot die coating, knife-over-roll coating, Mayer bar coating, gravure printing, screen printing, and roller coating. The electrically conductive material may have a thickness from about 1 nm to about 20 µm, from about 1 nm to about 15 µm, from about 1 nm to about 10 µm, or from about 1 nm to about 5 µm.

The electrically conductive material is partially or fully distributed on either the surface of the compacted retainable processing membrane or elastomer layer. Additionally, the electrically conductive material may be applied in such a manner that the material forms a pattern (e.g., circles, squares, lines, or grids) on the surface of the retainable processing membrane or the elastomer material. In some embodiments, the electrically conductive material forms a monolithic (e.g., continuous) coating on the surface. In another embodiment, the electrically conductive material at least partially penetrates the thickness of the retainable processing membrane. The depth of penetration may be substantially the same throughout the retainable processing membrane. In some embodiments, though, the partial penetration depth varies in the retainable processing membrane or elastomer layer. The porosity of the retainable processing membrane facilitates the penetration of the electrically conductive material into the membrane.

The dielectric composite also includes an elastomer material. Suitable elastomeric materials include, but are not limited to silicones, fluorosilicones, fluoroelastomers, polyurethanes, nitrile rubber, neoprene rubber, natural rubber, butyl rubber, and acrylics. The thickness of the elastomer material may be from about 0.1 µm to about 100 µm, from about 0.1 µm to about 90 µm, from about 0.1 µm to about 80 µm, from about 0.1 µm to about 70 µm, from about 0.1 µm to about 60 µm, from about 0.1 µm to about 50 µm, from about 0.1 µm to about 40 µm, from about 0.1 µm to about 30 µm, from about 0.1 µm to about 25 µm, from about 0.1 µm to about 15 µm, or from about 0.1 µm to about 10 µm. It is to be appreciated that the thickness of the elastomer material includes the elastomer material present on the surface and the portion of the elastomer material which has penetrated the retainable processing membrane. It is also to be appreciated that the materials and methods described herein are applicable to all embodiments of the present disclosure.

In one embodiment depicted schematically in FIG. 1, the dielectric composite 100 includes a retainable processing membrane 10, an elastomer material 20, and an electrically conductive material 30. In exemplary embodiments, the retainable processing membrane 10 is compacted in the transverse direction. An elastomer material 20 is applied to the compacted retainable processing membrane 10. In the embodiment shown in FIG. 1, the elastomer material 20 is partially penetrated into the thickness of the retainable processing membrane 10 (penetration region 15). The partial penetration of the elastomer material 20 into the retainable processing membrane 10 permits better integration of the elastomer material into the dielectric composite 200 and helps to retain the integrity of the dielectric composite 200. The porosity of the retainable processing membrane 10 permits the elastomer 20 to penetrate the surface of the membrane 10. An electrically conductive material 30 is applied to the surface of the elastomer material 20.

Figure 2A:
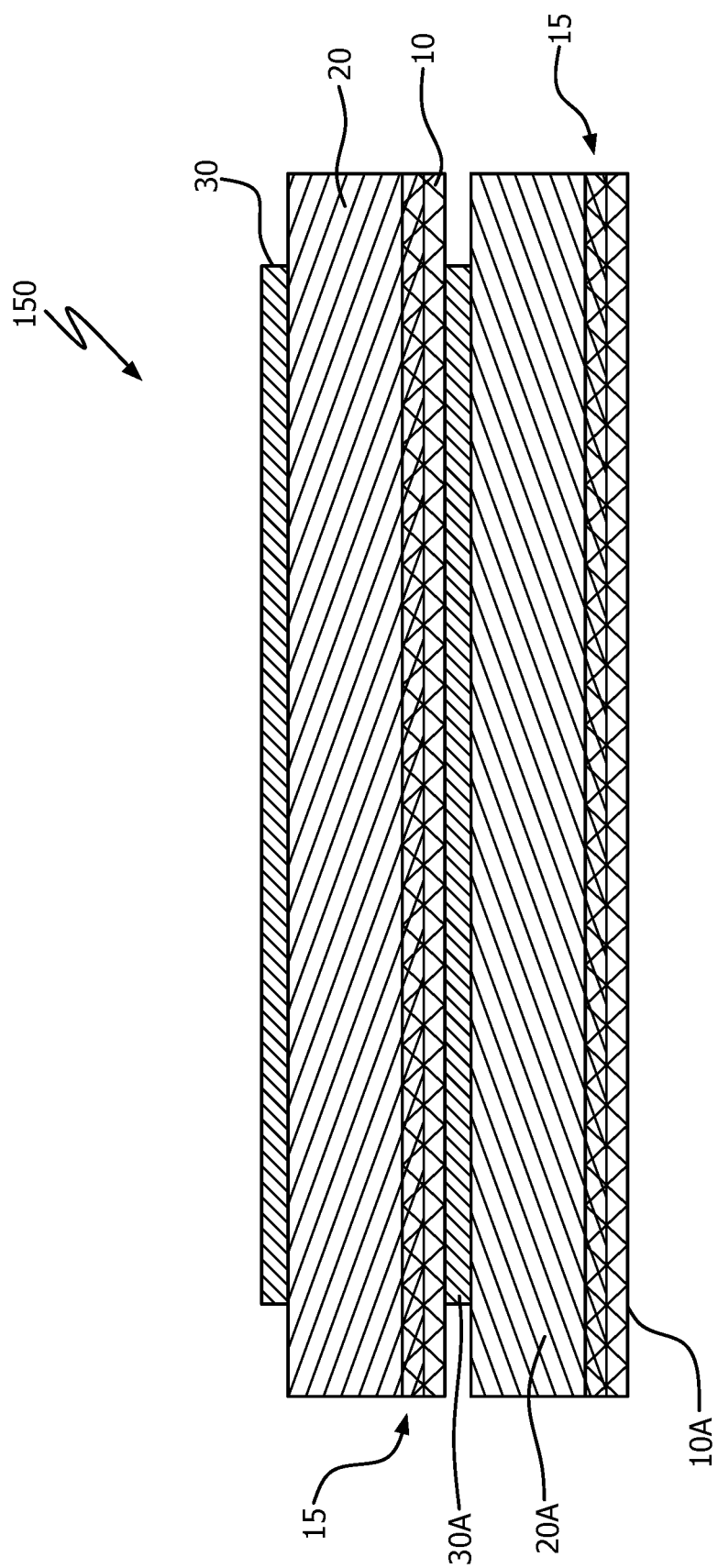
FIG. 2A is a schematic illustration of the cross-section of a stacked dielectric elastomer composite assembly that includes the dielectric composite of FIG. 1 according to at least one embodiment.

Dielectric composites 100 may be positioned on top of each other in a stacked configuration as shown in FIG. 2A to form a stacked dielectric elastomer composite assembly 150. FIG. 2B is a top view of the stacked dielectric elastomer composite assembly 150 showing the patterned electrically conductive material 30 (e.g. graphite nanoparticles) on the elastomer material 20. The retainable processing membrane 10, the elastomer material 20, and the electrically conductive material may or may not be the same as the retainable processing membrane 10A, the elastomer material 20A, and the electrically conductive material 30A, respectively, in the stacked dielectric elastomer composite 250. It is to be appreciated, however, that the materials 10A, 20A, and 30A, individually, act in a similar manner to its respective counterpart. The total number of dielectric composites present in the stacked dielectric elastomer composite assembly 150 is not particularly limited, and depends on the desired end use. Non-limiting uses for the dielectric elastomer composites described herein include soft robotics, artificial muscle, haptic feedback in automotive user interfaces or consumer electronics, prosthetics, fluid control, energy harvesting, wearable sensors, tunable or adaptive optics, such as optical positioners, speakers, active braille displays, and membrane pumps. The stacked dielectric elastomer composite assembly 150 may include 2, 5, 10, 50, 100, 250, 500, 750, or even 1000 or more dielectric composites 100.

Figure 3:
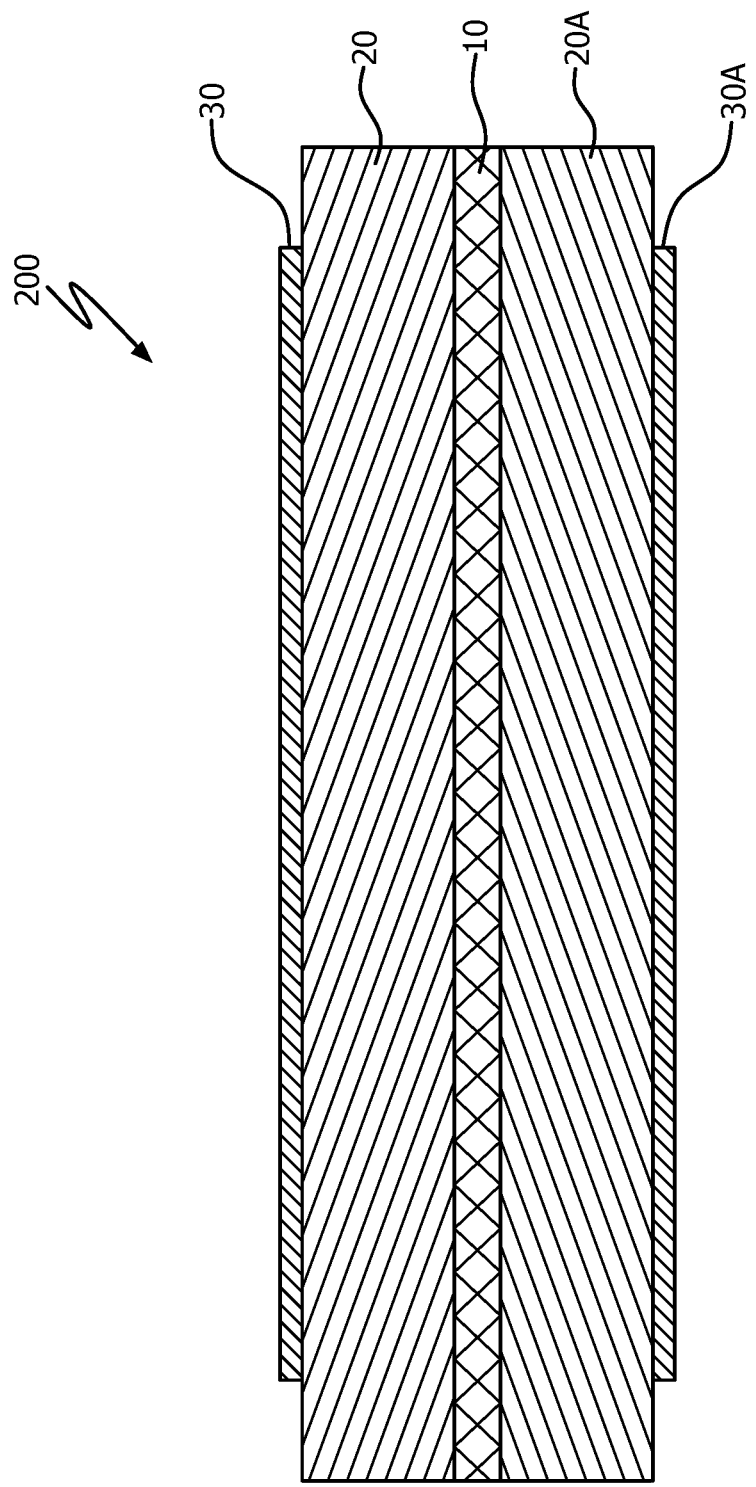
FIG. 3 is a schematic illustration of the cross-section of an electrically conductive 5-layer composite including a centrally located retainable processing layer, two elastomer layers, and two electrically conductive layer according to at least one embodiment.
Figure 4:
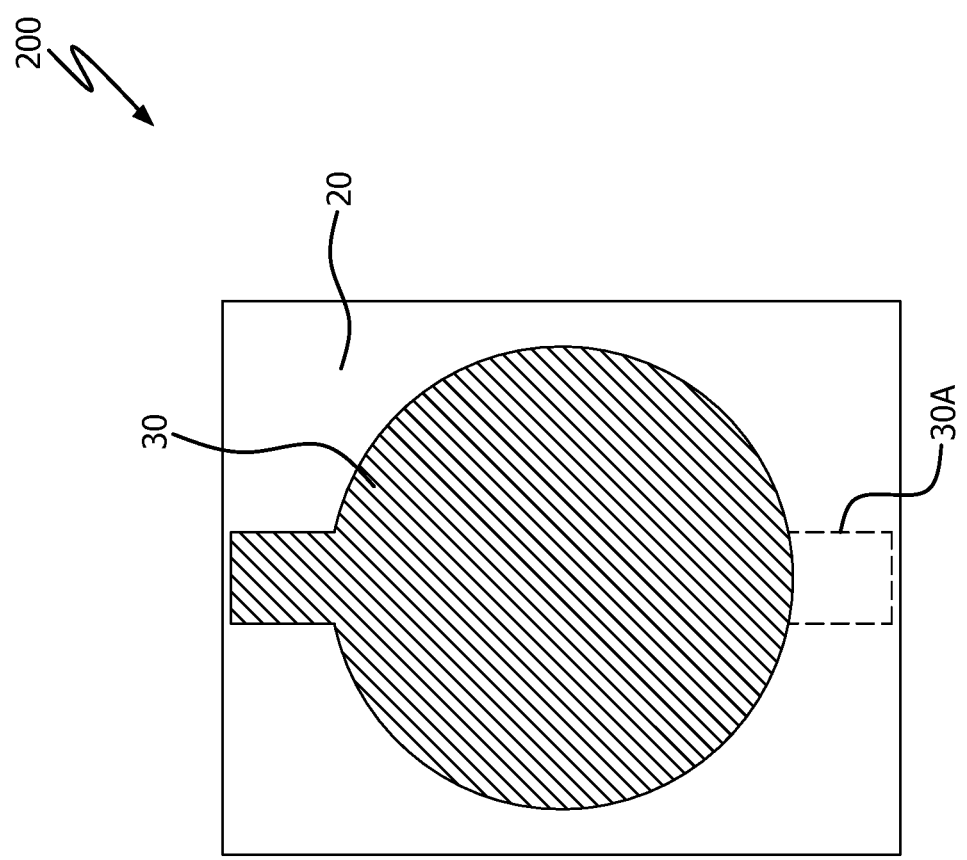
FIG. 4 is a schematic illustration of the top view of the electrically conductive 5-layer composite of FIG. 3 having thereon an electrically conductive material on both sides according to at least one embodiment.

FIG. 3 depicts an embodiment of a 5-layered dielectric elastomeric composite 200. In this embodiment, a first elastomer layer 20 is applied to a first side of a retainable processing membrane 10 and a second elastomer layer 20A is applied to a second, opposing side of the retainable processing membrane 10. A first electrically conductive material 30 is then positioned on the first elastomer layer 20. Similarly, a second electrically conductive material 30A is positioned on the second elastomer material 30. In this embodiment, neither the first or second elastomer layer 20, 20A penetrate the retainable processing membrane 10. The electrically conductive materials 30, 30A may be applied in a pattern, such as, for example, the pattern depicted in FIG. 4.

Figure 5:
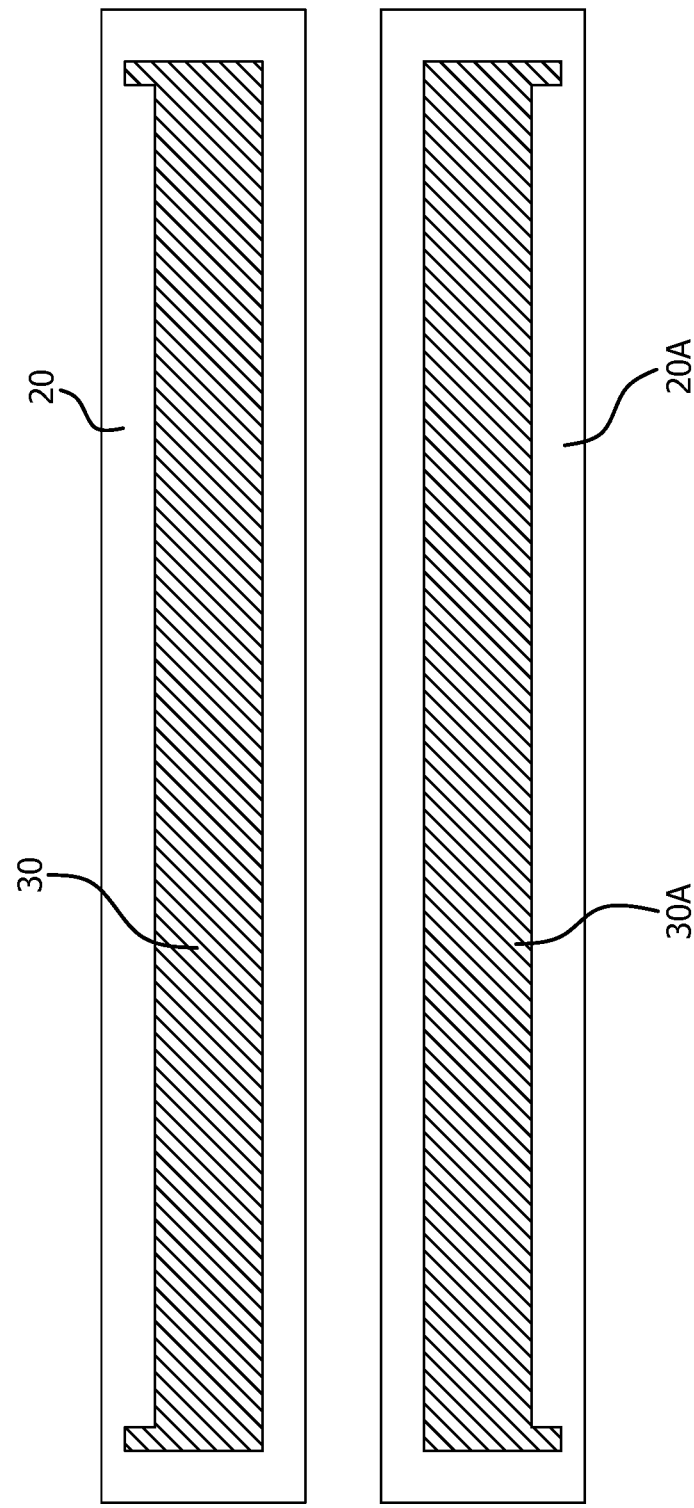
FIG. 5 is a schematic illustration of the top-view of two stacked dielectric composites with different electrode orientations according to at least one embodiment.
Figure 6:
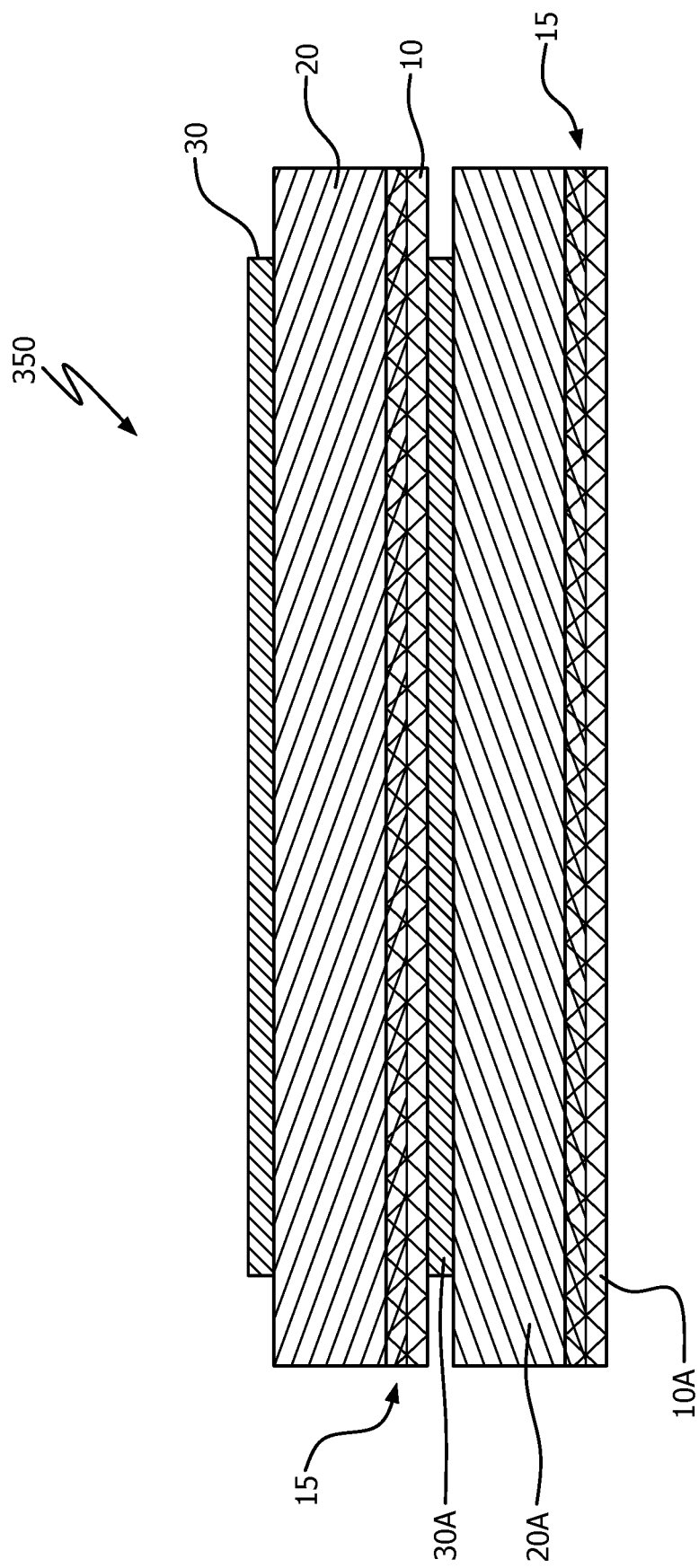
FIG. 6 is a schematic illustration of the cross-section of the stacked dielectric elastomer composite assembly of Example 4 according to at least one embodiment.
Figure 12:
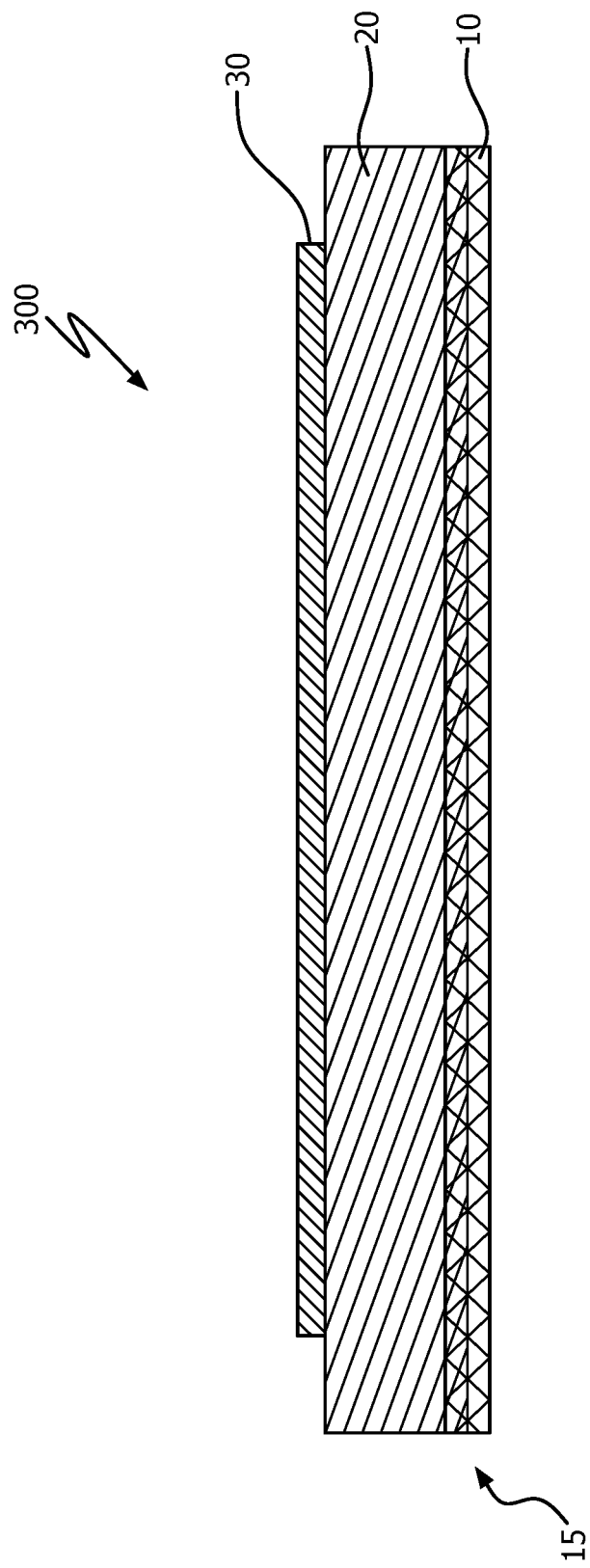
FIG. 12 is a schematic illustration of the cross-section of the dielectric composite of Example 4 according to at least one embodiment.

In another embodiment, dielectric composites as described herein may be formed into a dielectric wrapped composite tube. As described in detail in Example 4 and schematically illustrated in FIG. 12, two (or more) dielectric composites 300 containing a retainable processing membrane 10, an elastomeric material 20 partially penetrating into the retainable processing membrane 10, and an electrically conductive material 30 on the surface of the elastomer material 20 and having different electrode orientation (such as is depicted in FIG. 5) are stacked (as illustrated in FIG. 6) to form a stacked dielectric elastomer composite assembly 350. It is to be appreciated that the electrode orientation may be different from that depicted in FIG. 12 and still fall within the purview of the invention. The stacked assembly 350 is wrapped around a circular member, such as a metal core (not depicted). Once fully wound, the wrapped composite tube 500 is removed from the circular member, such as is depicted in FIG. 14. No adhesive is needed to bond the layers together during the wrapping process at least due to the tension provided in the wrapping process.

Figure 7A:
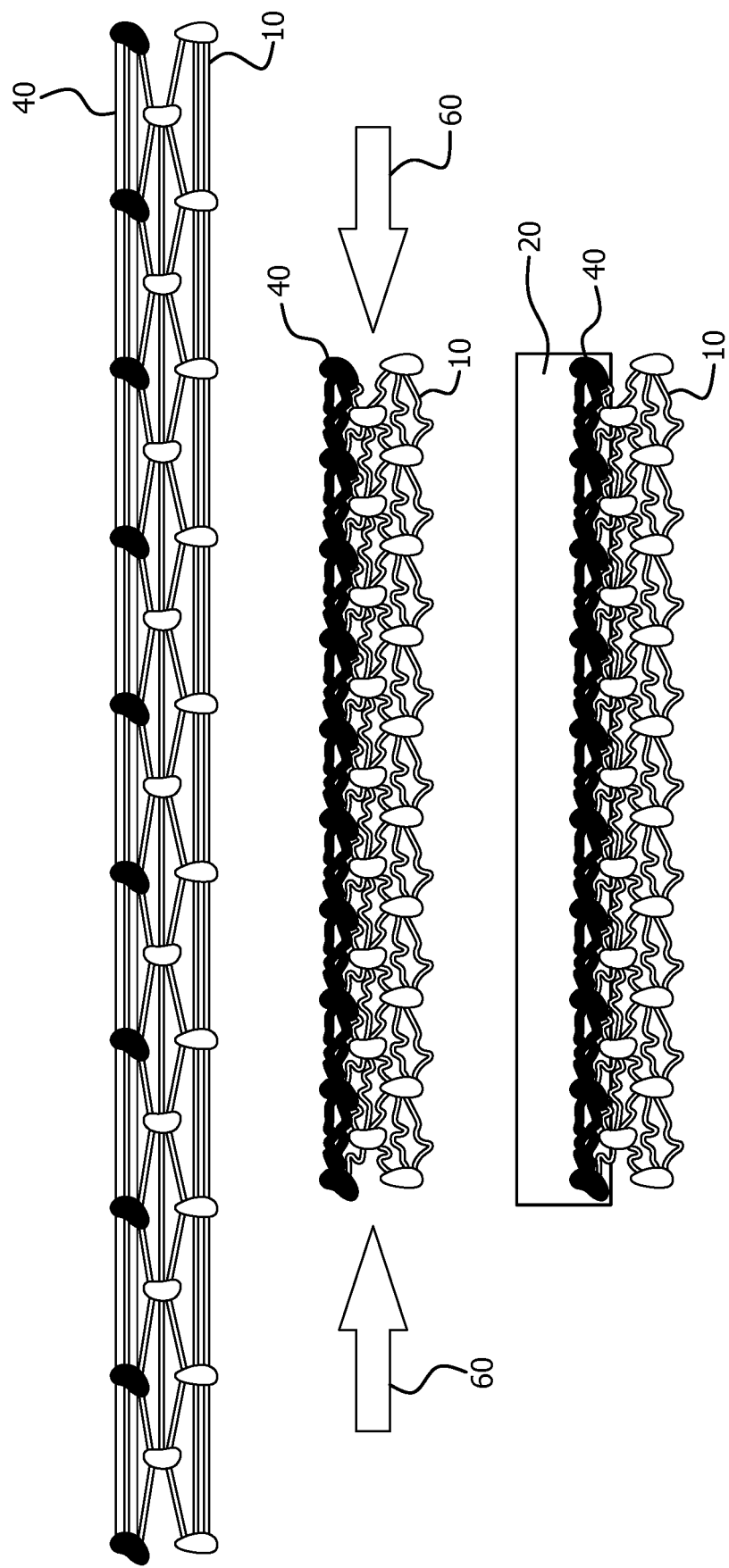
FIG. 7A is a schematic illustration depicting the construction of a metallized compacted porous film coated with an elastomeric film according to at least one embodiment.

The present disclosure also relates to a metallized compacted porous film coated with an elastomer material. Turning to FIG. 7A, a thin metallized layer or coating 40 is deposited onto a retainable processing membrane 10 such as by brushing or vapor deposition. The metallized retainable processing member is then compacted in the transverse direction (in the direction of arrows 60). An elastomer material 20 is applied to the metallized layer 40 of the retainable processing member 10 such that the elastomer material 20 partially penetrates the retainable processing member 10 and encompasses the metallized layer 40. It is to be appreciated that the metallized layer (i.e., the electrically conductive layer) may be encompassed by the elastomer material so long as the metallized layer (electrically conductive layer) may be contacted.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

EXAMPLES

Example 1

Figure 15:
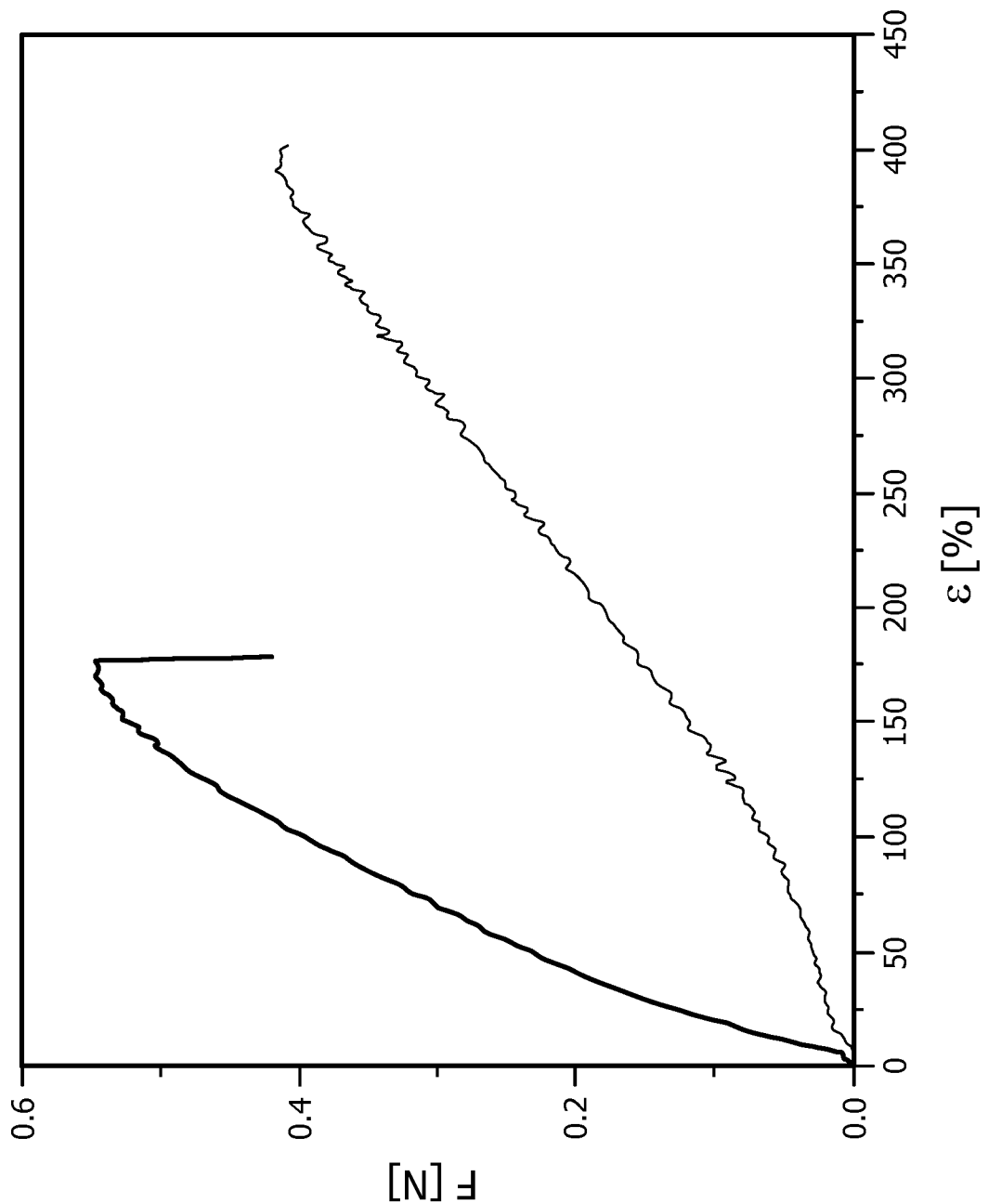
FIG. 15 is a graphical illustration depicting the force of the compacted ePTFE vs. a non-compacted ePTFE according to at least one embodiment.

An expanded polytetrafluoroethylene (ePTFE) membrane was made generally in accordance with the teachings of U.S. Pat. No. 7,306,729 to Bacino et al. The ePTFE membrane had an average mass/area of 0.5 g/m$^2$ and an average thickness of about 0.6 μm. The ePTFE membrane was compacted in the transverse direction (TD) as is taught in Example 4A of EP3061598 A1 to Zaggl et al. The processing ratio was 100% at room temperature (approximately 20° C.) and 2 m/min speed setting. The modulus testing was conducted utilizing a Zwick Roell Z005 Tensile Tester (Georgia, USA) with the following parameters: measurement speed: 508 mm/min; clamping length: 82.55 mm; sample width: 6 mm. After processing, the modulus of the ePTFE membrane in the TD was reduced significantly, as is shown in FIG. 15 and in Table 1.

Table 1

TABLE 1

|  | Compacted ePTFE | ePTFE |
|---|---|---|
| Force at 25% elongation | 0.018 N | 0.126 N |
| Force at 50% elongation | 0.029 N | 0.238 N |
| Force at 100% elongation | 0.062 N | 0.400 N |

The compacted porous ePTFE membrane was positioned on a polyethylene terephthalate (PET) release layer (HOSTAPHAN® RNK 50, MITSUBISHI POLYESTER FILM GmbH, Wiesbaden, Germany) prior to coating. The ePTFE membrane/release layer stack was placed on a glass plate which was then inserted into an automatic film applicator (model ZAA 2300, Zehntner GmbH Testing Instruments, Sissach, Switzerland).

An elastomer was obtained by providing a pourable, addition-curing, two-component silicone rubber (ELASTOSIL® P7670, (Wacker Chemie AG, München, Germany)) and mixing components A and B of the silicone rubber in a ratio of 1:1 using a SPEEDMIXER™ DAC 150.1 FVZ-K (FlackTek Inc., Landrum, S.C.) at 1500 rpm and 20 seconds mixing time. The mixed components were poured onto the compacted porous ePTFE membrane sitting on the PET release liner. A universal applicator, type ZUA 2000 (Zehntner GmbH Testing Instruments) was used to equally distribute a thin elastomer film on the ePTFE membrane using a speed of 5 mm/s at 20° C.

Figure 18:
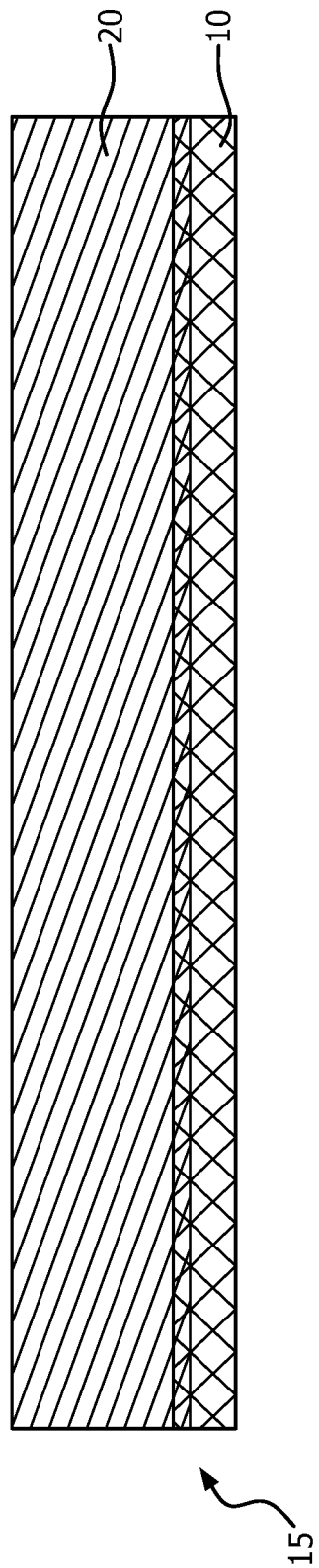
FIG. 18 is a schematic illustration of the cross-section of a compacted expanded polytetrafluoroethylene (ePTFE) membrane with an elastomer material partially penetrating the ePTFE membrane according to at least one embodiment.

The gap of the applicator was set to a 50 μm distance from the PET release layer. The elastomer film was cured at room temperature (approximately 20° C.) for 24 hours. FIG. 18 is a schematic illustration depicting the elastomer on the compacted porous ePTFE membrane with high penetration of the elastomer into the ePTFE membrane. The resulting ePTFE membrane/elastomer had a thickness of about 30 μm.

To form an electrode on the elastomer/compacted porous film composite (and thus form a dielectric composite), graphite nanopowder (type CP-0019-HP; IoLiTec-Ionic Liquids Technologies GmbH, Heilbronn, Germany) was applied via a brushing technique in a patterned configuration using a lasercut mask of the PET release layer (HOSTAPHAN®

RNK 50 (MITSUBISHI POLYESTER FILM GmbH)). FIG. 1 is a schematic illustration of the cross section of the dielectric composite. FIG. 2B is a top view of FIG. 1 depicting the pattern of the graphite nanopowder.

To form a multilayer composite material, two of the dielectric composites (as depicted in FIG. 1) were stacked as schematically illustrated in FIG. 2A (cross-section) and FIG. 2B (top view). A pressure roller was used to press both composite layers together so that there was no air gap between the electrode and the compacted porous ePTFE film.

Example 2

An ePTFE membrane was made generally in accordance with the teachings of U.S. Pat. No. 7,306,729 to Bacino, et al. The ePTFE membrane had an average mass/area of 0.5 g/m² and an average thickness of about 0.6 µm.

The ePTFE membrane was mounted in a metal frame having an inner diameter of 5 cm. A sufficient amount of platinum was deposited on the surface of the ePTFE membrane to form an electrically conductive layer using a Gressington Sputter Coater, type 108 auto (Cressington Scientific Instruments UK, Watford, UK) with the parameters of 10 mA and 20 seconds.

The metallized ePTFE membrane was removed from the frame and positioned on a stretched silicone sheet. The ePTFE/silicone sheet was compacted biaxially to the original material as is taught in EP3061598 A1 to Zaggl et al. The processing ratio was set to 25% biaxial compaction. The metallized compacted porous ePTFE membrane was placed on a polyethylene terephthalate (PET) release liner with a pressure sensitive acrylic adhesive (Duplocoll MP6001B (Lohmann GmbH & Co. KG) prior to coating. The ePTFE membrane/release layer stack was placed on a glass plate which was then inserted into an automatic film applicator (model ZAA 2300, Zehntner GmbH Testing Instruments).

An elastomer was obtained by providing a liquid, two-component silicone rubber (ELASTOSIL® LR3003/03 Wacker Chemie AG) and mixing components A and B of the silicone rubber in a ratio of 1:1 using a SPEEDMIXER™, DAC 150.1 FVZ-K (FlackTek Inc.) at 2000 rpm and 25 seconds mixing time. The mixed components were poured onto the metallized compacted porous ePTFE membrane sitting on the PET release liner. A universal applicator, type ZUA 2000 (Zehntner GmbH Testing Instruments) was used to equally distribute a thin film on the ePTFE membrane using a speed of 5 mm/s at room temperature.

Figure 7B:
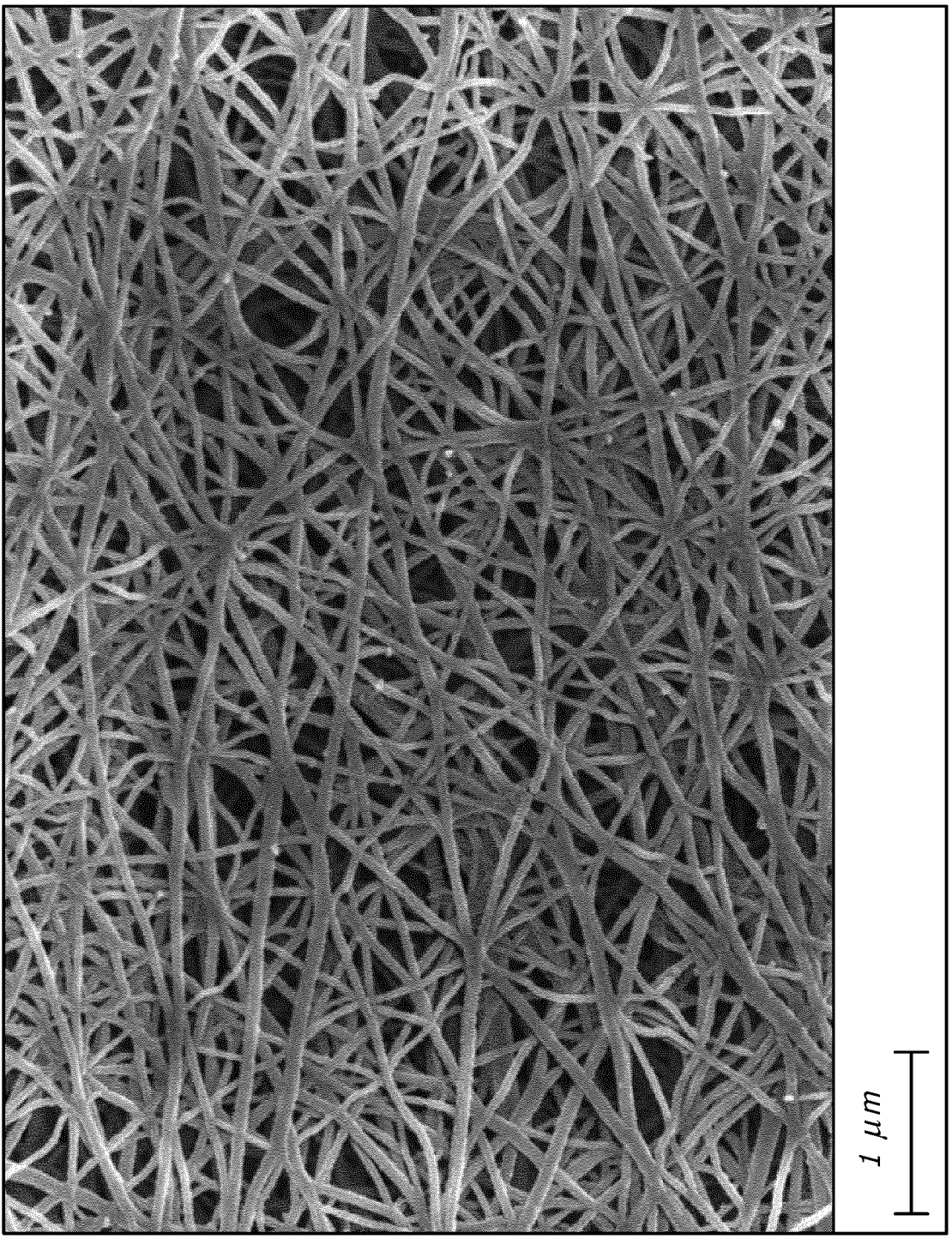
FIG. 7B is a scanning electron micrograph of the surface of the metallized ePTFE membrane of Example 2 to at least one embodiment.
Figure 8:
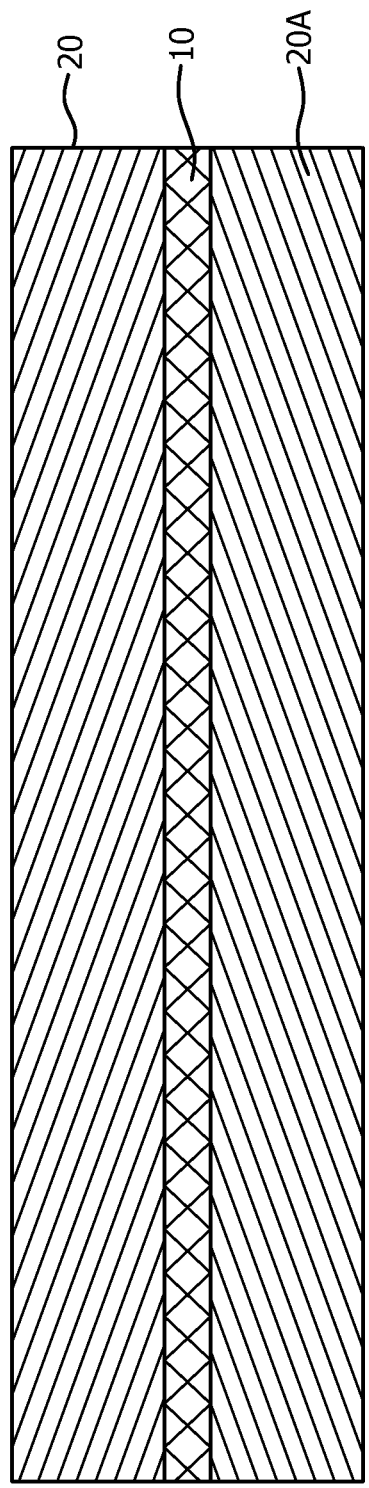
FIG. 8 is a schematic illustration of a 3-layer composite film according to at least one embodiment.

The gap of the applicator was set to a 50 µm distance from the PET release layer. The elastomer film was cured at 150° C. for 5 minutes. FIG. 7A is a schematic illustration depicting the making of a metallized compacted porous film coated with an elastomeric film. FIG. 7B is a scanning electron micrograph of the surface of the metallized ePTFE membrane.

Example 3

An ePTFE membrane generally in accordance with the teachings of U.S. Pat. No. 7,306,729 to Bacino, et al. The ePTFE membrane had an average mass/area of 0.5 g/m² and an average thickness of about 0.6 µm. The ePTFE membrane was compacted in the transverse direction of the original material as is taught in Example 4A of EP3061598 A1 to Zaggl et al. The processing ratio was 100% at 20° C. and 2 m/min speed setting.

The compacted porous ePTFE membrane was slightly pressed with a rubber roller on an acrylic tape on craft paper release liner (VHB) (type VHB 9460 (3M Deutschland GmbH, Neuss, Germany)) having a thickness of 50 µm to apply a layer of VHB tape on one side of the ePTFE membrane. A second layer of VHB tape was applied on the other side of the compacted porous ePTFE membrane in the same manner. The craft paper release liners were gently removed to obtain a 3-layer composite film. The strength of the compacted porous ePTFE film was beneficial so as to not rupture the delicate 3-layer composite film when the release liners were removed. A 3-layer composite film (acrylic tape/ePTFE membrane/acrylic tape) is thus formed. To form an electrode on the 3-layer composite film, graphite nanopowder, type CP-0019-HP (IoLiTec-Ionic Liquids Technologies GmbH) was applied via a brushing technique in a patterned configuration on both sides of the composite.

Figure 9:
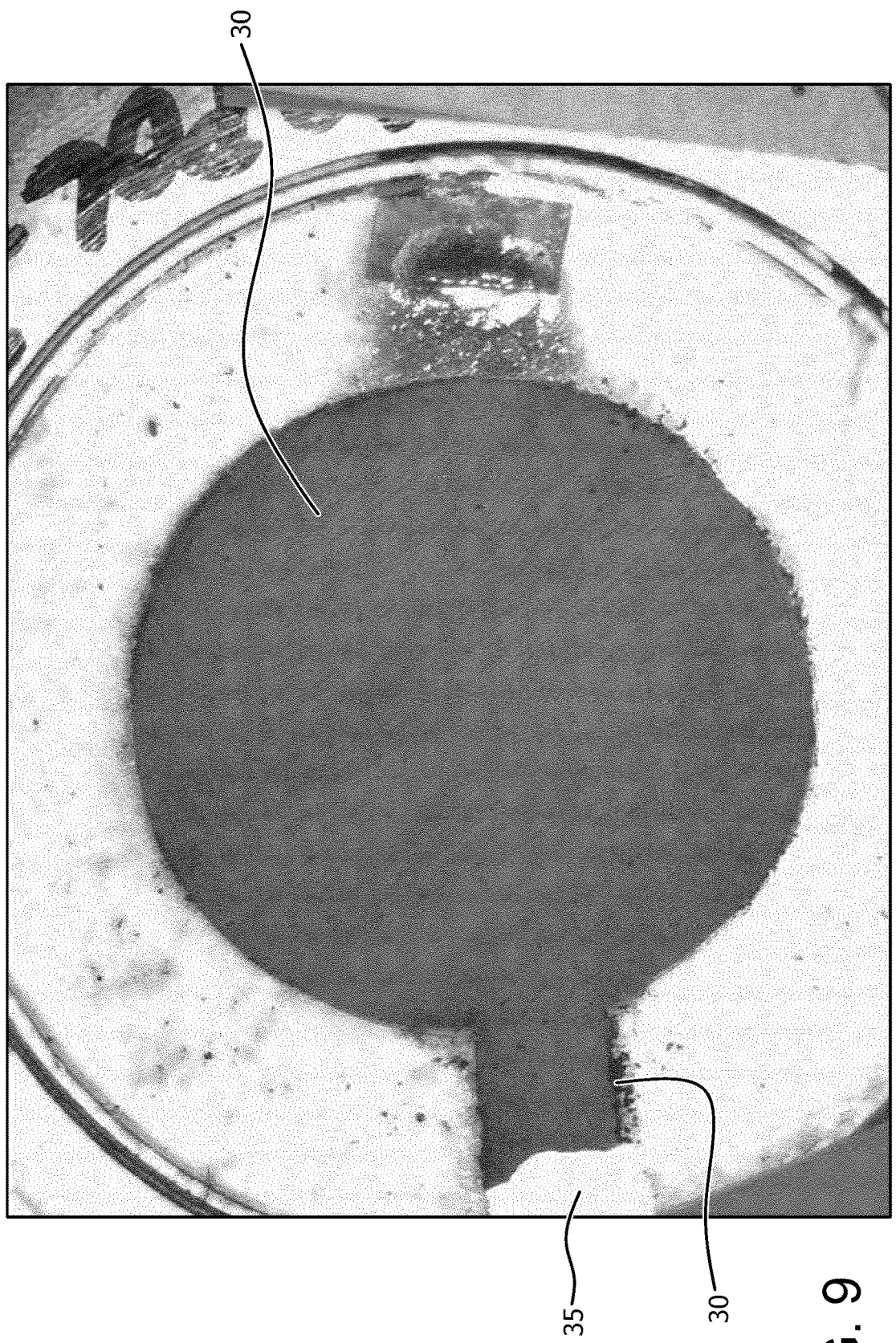
FIG. 9 is an image of the top view of the sample of Example 3 showing the top aluminum strip according to at least one embodiment.

A portion of the electrically conductive 3-layer composite was cut out and contacted with thin aluminum foil strips on the small rectangular ends of the applied electrode pattern (both front and back sides) using a silver ink, type Acheson Silver Dag 1415 (Agar Scientific Ltd., Essex, UK). FIG. 9 is an image of the top view of the sample showing the top aluminum strip 35 bonded to electrically conductive material 30 of the 3-layer composite as well as the pattern of the graphite nanoparticles that were placed using a lasercut mask of a PET release layer (HOSTAPHAN® RNK 50, MITSUBISHI POLYESTER FILM GmbH).

Figure 10:
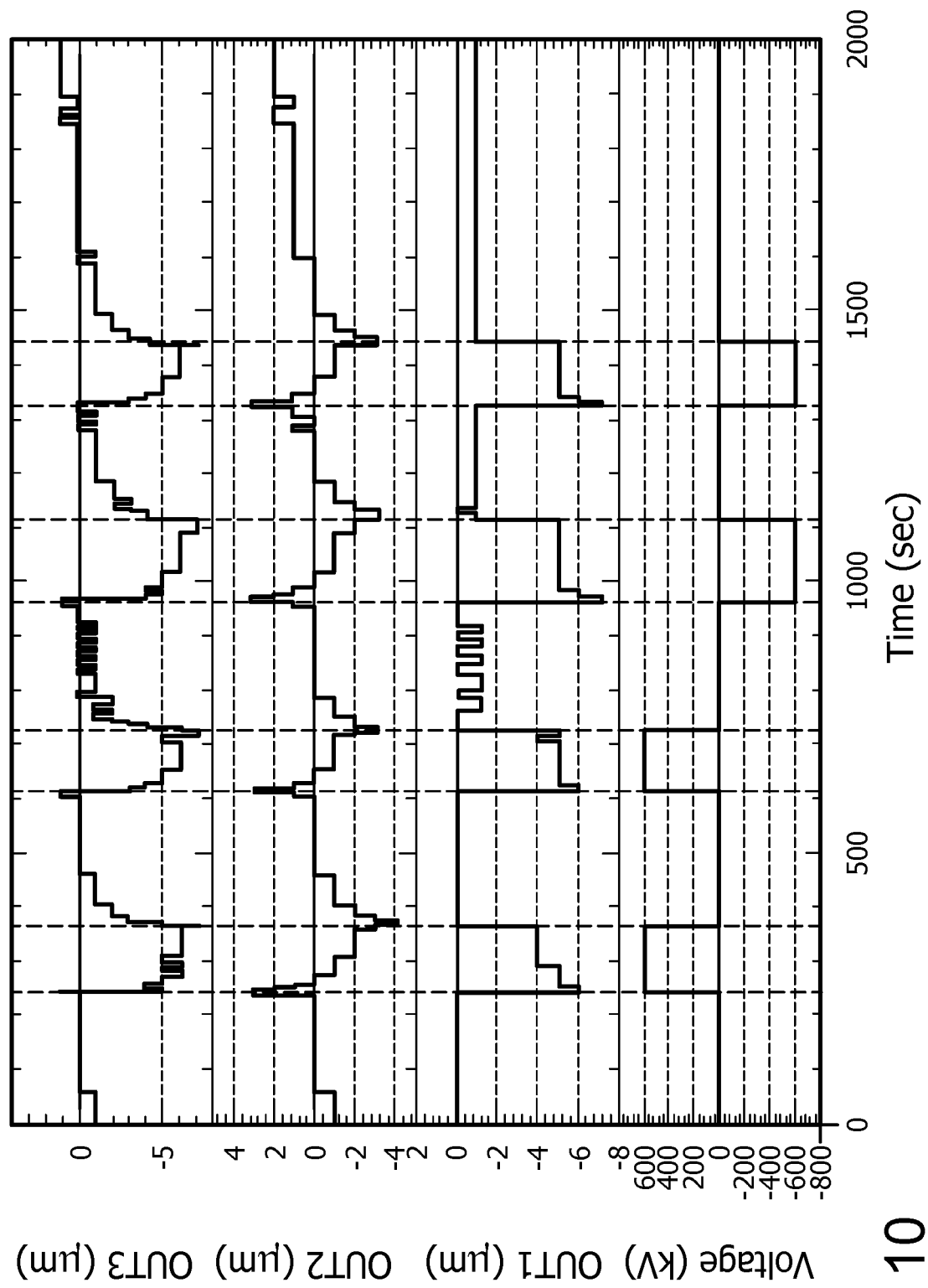
FIG. 10 is a graphical illustration of the results of the Laser Triangulation Measurement Technique of the sample of Example 3 according to at least one embodiment.
Figure 11:
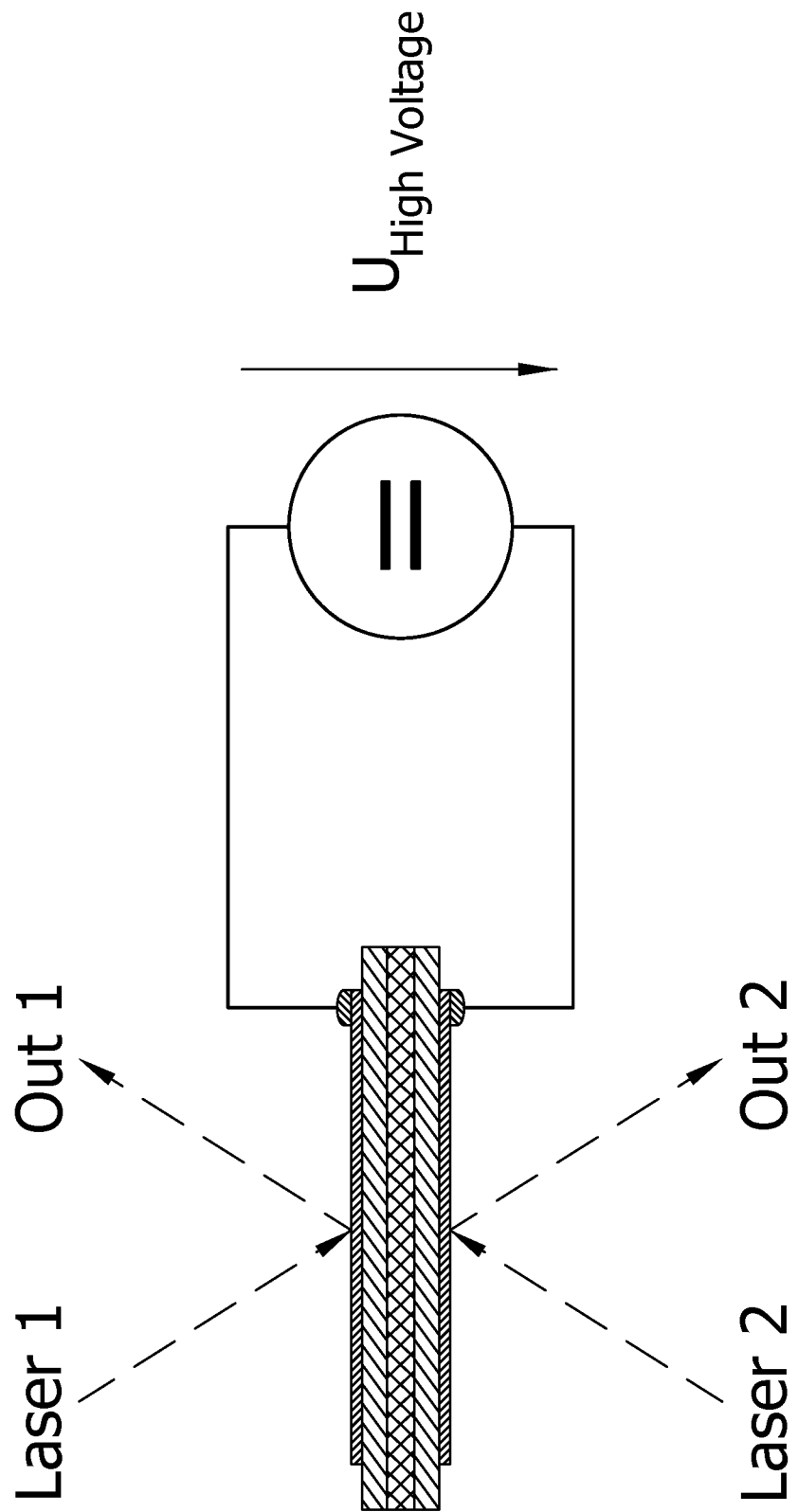
FIG. 11 is the measurement set for the Laser Triangulation Measurement Technique of FIG. 10 according to at least one embodiment.

The 3-layer composite was then characterized by Laser Triangulation Measurement Technique at different Voltages (see *"Dielektrische Elastomerstapelaktoren für ein peristaltisches Fluidfördersystem"*, Dipl. Ing. Lotz; Dissertationsschrift; Technische Universitat Darmstadt, 2010, Darmstadt, Germany). The components used include Keyence LK-H022 Ultra High-Speed/High-Accuracy Laser Displacement Sensor (Keyence Corp., Itasca, Ill.) and high voltage supply FUG Series MCP 35-2000 (FuG Elektronik GmbH, Schechen, Germany). The measurement set is illustrated in FIG. 11. The results are graphically depicted in FIG. 10. Signal OUT 1 and OUT 2 are corresponding to the two laser signals, Laser 1 and Laser 2. Signal OUT 3 represents the sum of OUT 1 and OUT 2 and shows an actuation at 600 volts (V), independent from the voltage polarization.

Example 4

An ePTFE membrane was made generally in accordance with the teachings of U.S. Pat. No. 7,306,729 to Bacino, et al. The ePTFE membrane had an average mass/area of 0.5 g/m² and a thickness of about 0.6 µm. The ePTFE membrane was compacted in the transverse direction (TD) to the original material as is taught in Example 4A of EP3061598 A1 to Zaggl et al. The processing ratio was 100% at room temperature and 2 m/min speed setting. After processing, the modulus of the ePTFE membrane in the TD was significantly reduced. The reduction in TD was similar to that shown in Table 1 and FIG. 15.

The compacted porous ePTFE membrane was positioned on a PET release layer (HOSTAPHAN® RNK 50, MITSUBISHI POLYESTER FILM GmbH)) prior coating. The ePTFE membrane/PET stack was positioned on a glass plate which was then inserted into an automatic film applicator (model ZAA 2300 (Zehntner GmbH Testing Instruments)).

An elastomer was obtained by providing a pourable, addition-curing, two-component silicone rubber (ELASTOSIL® P7670, Wacker Chemie AG) and mixing components A and B of the silicone rubber in a ratio of 1:1 using a SPEEDMIXER™ DAC 150.1 FVZ-K (FlackTek Inc.) at 1500 rpm and 20 seconds mixing time. The mixed components were poured onto the compacted porous ePTFE membrane sitting on the PET release liner. A universal applicator, type ZUA 2000 (Zehntner GmbH Testing Instruments) was used to equally distribute a thin elastomer film on the ePTFE membrane using a speed of 5 mm/s at room temperature (approximately 20° C.).

The gap of the applicator was set to a 50 μm distance from the PET release layer. The elastomer film was cured at room temperature for 24 hours. FIG. 18 is a schematic illustration of such an elastomer on a compacted porous ePTFE membrane with a high penetration of the elastomer into the ePTFE membrane. The resulting ePTFE membrane/elastomer had a thickness of about 30 μm.

To form an electrode on the elastomer/compacted porous film composite, graphite nanopowder (type CP-0019-HP; IoLiTec-Ionic Liquids Technologies GmbH) was applied via a brushing technique in a patterned configuration using a lasercut mask of a PET release layer (HOSTAPHAN® RNK 50, MITSUBISHI POLYESTER FILM, GmbH).

To form a multilayer composite material, two of the dielectric composites with different electrode orientations as depicted in FIG. 5 were stacked as illustrated in FIG. 6. It is to be noted that the orientations of the electrodes are not visible in this cross-section. FIG. 6 is included to illustrate the positioning of the compacted porous ePTFE membrane (10), elastomer films (20), and graphite nanopowder (30). A pressure roller was used to press both composite layers together so that there was no air gap between the electrode and the compacted porous ePTFE film.

Figure 13:
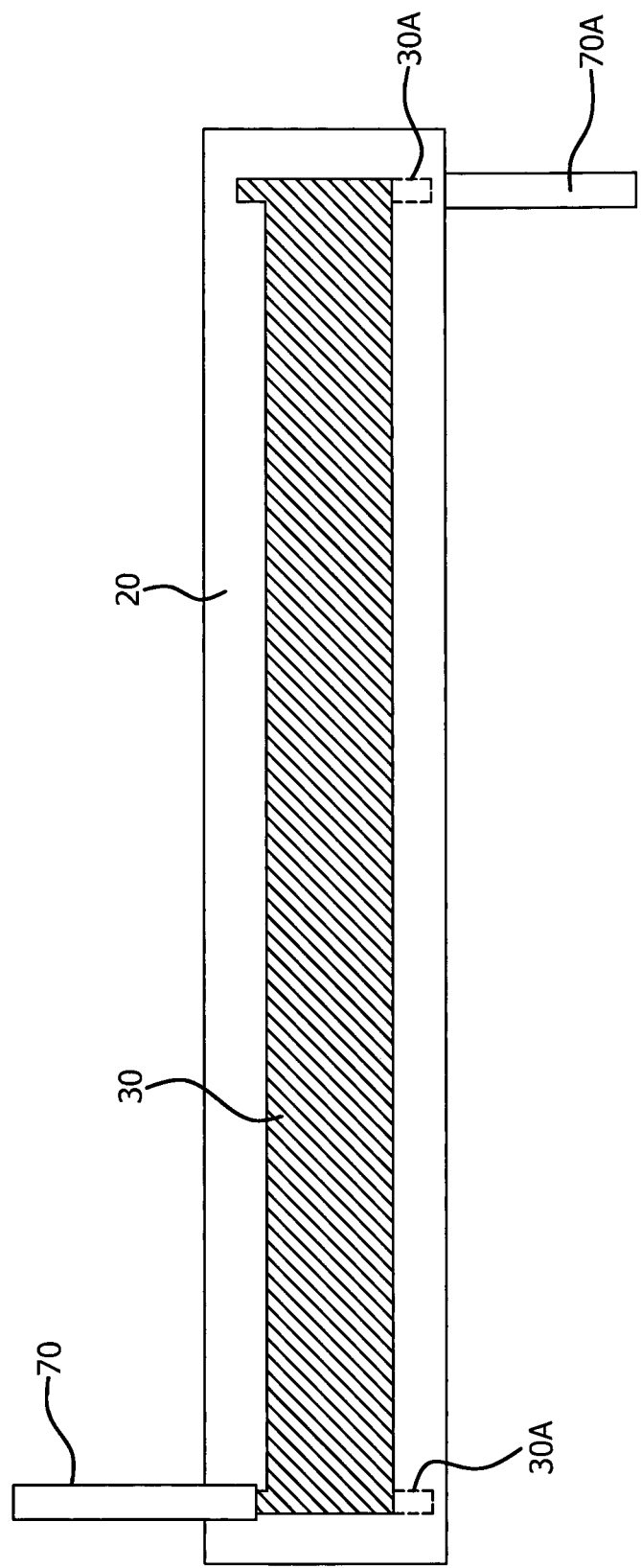
FIG. 13 is a schematic illustration of the top view of the dielectric composite of FIG. 12 showing 2 layers of graphite nanoparticles with a mirrored electrode pattern according to at least one embodiment.

After forming the stacked multilayer composite material, aluminum strips 70, 70A were applied on both sides of the composite material to contact both electrodes (see FIG. 13).

The composite material with the aluminum strips was rolled on a 20 millimeter (mm) diameter metal core that was covered by a tube-shaped textile on top, to be able to remove the wrapped composite tube from the metal core.

The composite material was wrapped under tension on the metal core while rotating the core and applying back tension on the composite material with a mechanical break. The dielectric wrapped composite tube was removed from the metal core and the inner textile tube layer was removed. There was no further adhesive used to bond the layers together during the wrapping process.

The dielectric wrapped composite tube was contacted on both aluminum strips as schematically depicted in FIG. 14 and a voltage of 600V was applied. A movement of the wrapped composite tube in 90° of the wrapping direction was observed.

Example 5

Figure 16:
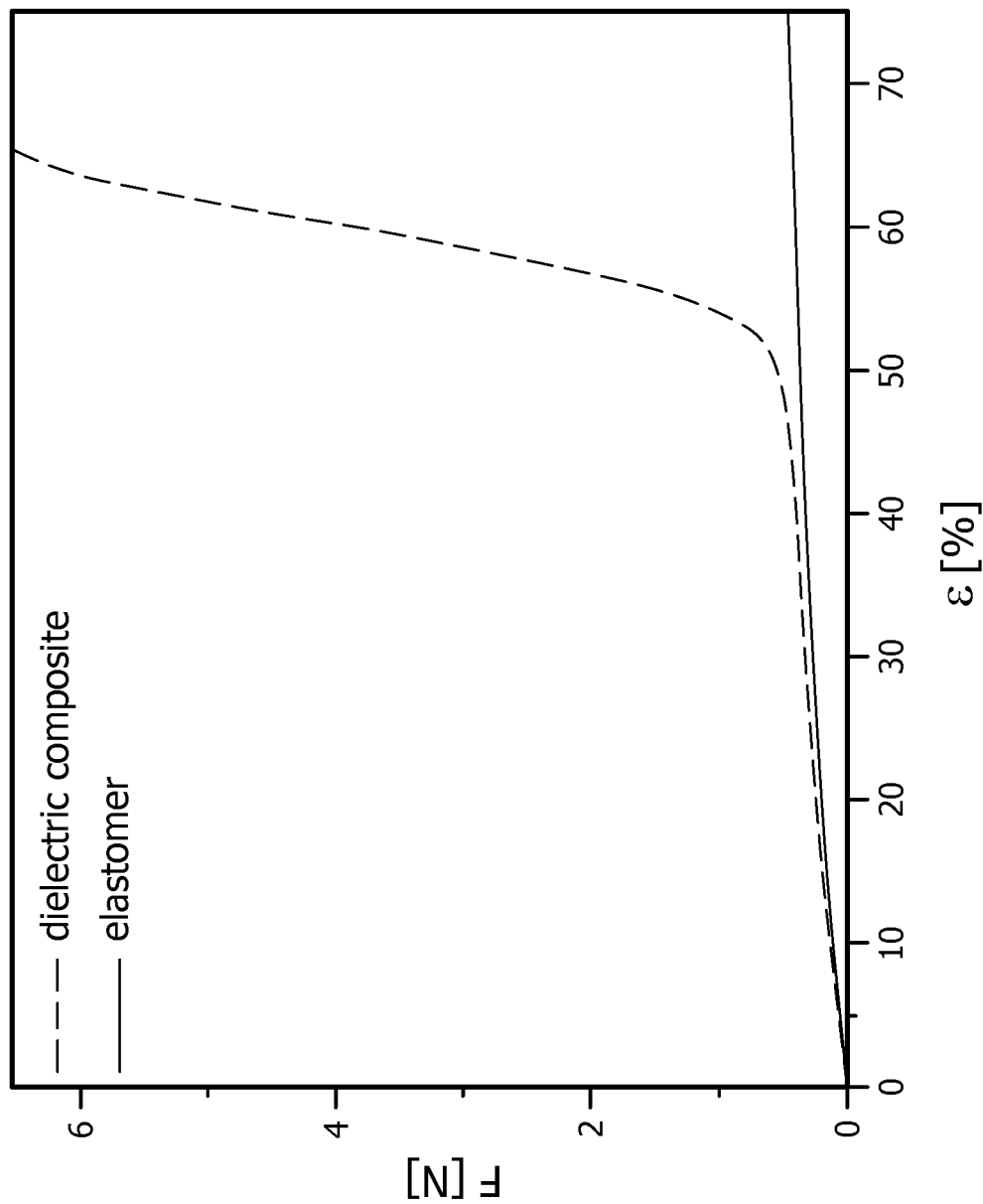
FIG. 16 is a graphical illustration depicting the force of a dielectric composite containing a compacted ePTFE film vs. an elastomer film according to at least one embodiment.

An expanded polytetrafluoroethylene (ePTFE) membrane was made generally in accordance with the teachings of U.S. Pat. No. 7,306,729 to Bacino et al. The ePTFE membrane had an average mass/area of 0.5 g/m² and an average thickness of about 0.6 μm. The ePTFE membrane was compacted in the machine (MD) as is taught in EP3061598 A1 to Zaggl et al. The processing ratio was 66% at room temperature (approximately 20° C.) and 2 m/min speed setting. During the process, the membrane was placed to a PET release liner coated with pressure sensitive acrylic adhesive (Duplocoll MP6001B (Lohmann GmbH & Co. KG)). An elastomer was obtained by providing a pourable, addition-curing, two-component silicone rubber (ELASTOSIL® RT620, Wacker Chemie AG) and mixing components A and B of the silicone rubber in a ratio of 1:1 using a SPEEDMIXER™ DAC 150.1 FVZ-K (FlackTek Inc.) at 1500 rpm and 20 seconds mixing time. The mixed components were poured onto the compacted porous ePTFE membrane sitting on the PET release liner. A universal applicator, type ZUA 2000 (Zehntner GmbH Testing Instruments) was used to equally distribute a thin elastomer film on the ePTFE membrane using a speed of 5 mm/s at room temperature (approximately 20° C.). The gap of the applicator was set to a 150 μm distance from the PET release layer. The elastomer film was cured at room temperature for 24 hours. The ePTFE membrane is the "dielectric composite" shown in FIG. 16. FIG. 16 is a graphical illustration that depicts a tensile test of a dielectric composite compared to a non reinforced silicone film.

Additionally, a second sample was prepared without the membrane precursor. The silicone was poured directly on a PET release layer (HOSTAPHAN® RNK 50, MITSUBISHI POLYESTER FILM GmbH, Wiesbaden, Germany). A universal applicator, type ZUA 2000 (Zehntner GmbH Testing Instruments) was used to equally distribute a thin elastomer film on the ePTFE membrane using a speed of 5 mm/s at room temperature (approximately 20° C.). The gap of the applicator was set to a 150 μm distance from the PET release layer. The elastomer film was cured at room temperature for 24 hours. This sample is depicted "elastomer" in the graph shown in FIG. 16.

The samples were tested with a Zwick Roell Z005 Tensile Tester (Georgia, USA). The sample width was 12 mm, clamping length was 50 mm, and the sample thickness was measured as 140 μm for both samples. The samples were tested with a speed of 20 in/min at a temperature of 25° C. The increase in force was calculated by dividing the force of the dielectric composite by the force of the elastomer. The results are graphically illustrated in FIG. 16.

Example 6

An ePTFE membrane was made generally in accordance with the teachings of U.S. Pat. No. 7,306,729 to Bacino, et al. The ePTFE membrane had an average mass/area of 0.5 g/m² and a thickness of about 0.6 μm. The ePTFE membrane was compacted in the transverse direction (TD) as is taught in Example 4A of EP3061598. A 20 μm silicone film (ELASTOSIL® FILM 2030 250/20) was treated with plasma in an atmosphere of air at a speed of 3 m/min and a power of 2 kW.

Figure 17:
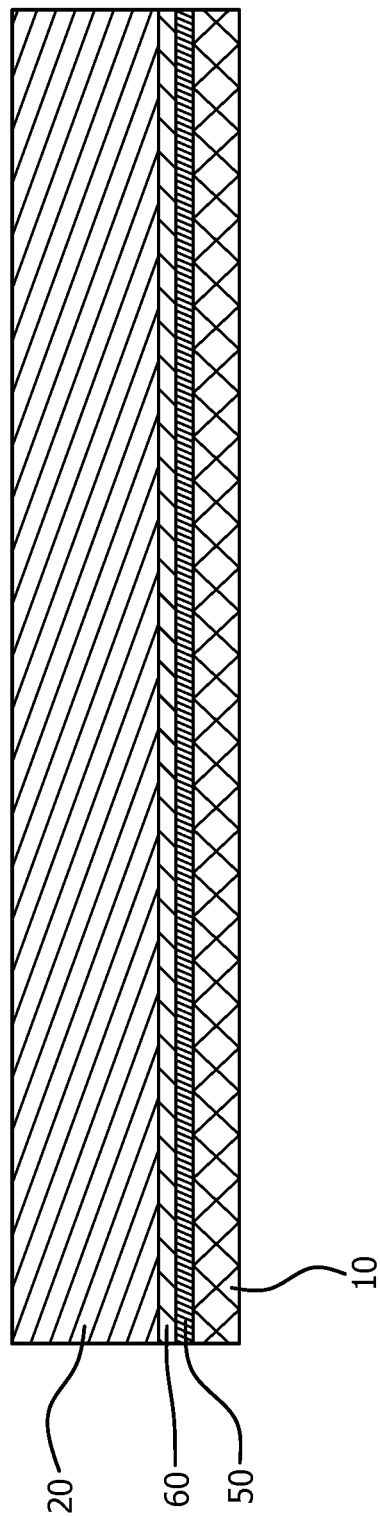
FIG. 17 is a schematic illustration of the reinforced elastomer composite of Example 7 according to at least one embodiment.

An elastomer was obtained by providing a pourable, addition-curing, two-component silicone rubber (ELASTOSIL® LR3003/03, Wacker Chemie AG) and mixing components A and B of the silicone rubber in a ratio of 1:1 using a SPEEDMIXER™ DAC 150.1 FVZ-K (FlackTek Inc.) at 1500 rpm and 20 seconds mixing time. Next, a pattern of uncured silicone was gravure coated using a micro gravure roller that contained 120 pyramid shaped structures per 10 mm on the treated silicone film continuously at a speed of 1 m/min. The transversely compacted ePTFE membrane that was transversely compacted was applied via slight tension onto the uncured silicone. The wet silicone penetrated into the ePTFE membrane and the silicone layer was then cured in an oven (BC dryer; Coatema Coating Machinery GmbH, Dormagen, Germany) at a temperature of 160° C. The total thickness of the resulting reinforced composite was 21 μm. The reinforced composite is schematically depicted in FIG. 17, with reference numeral 10 representing the compacted ePTFE, reference numeral 50 representing the treated silicone film, reference numeral 60 representing the untreated gravure coated silicone, and reference numeral 20 representing the silicone elastomer layer.

Example 7

An expanded polytetrafluoroethylene (ePTFE) membrane was made generally in accordance with the teachings of U.S. Pat. No. 3,953,566 to Gore. The ePTFE membrane had a thickness of 3 µm and an areal weight of 2.5 g/m². The ePTFE membrane was compacted 1.5:1 in the transverse direction. The transversely compacted porous ePTFE membrane was placed on a polyethylene terephthalate (PET) release liner with a pressure sensitive acrylic adhesive (Janus® PET1120, Rib GmbH) prior to coating. An elastomer was obtained by providing a pourable, addition-curing, two component silicone rubber (ELASTOSIL® P7684/60, Wacker Chemie AG) and mixing components A and B of the silicone rubber in a ratio of 1:1 in-line using a static mixer. The elastomer was applied via slot die coating and at least partially penetrated into the porous compacted ePTFE membrane structure. The dielectric composite was then dried in an oven (BC dryer; Coatema Coating Machinery GmbH, Dormagen, Germany) at 160° C. An average thickness of 49.5 µm was achieved for the dielectric composite.

To measure the actuation of the film, a single sheet was cut from the continuous roll with a length in the machine direction (MD) of 24 cm and a width in the transverse direction (TD) of 10 cm. An electrode material (ELASTO-SIL® LR3162, Wacker Chemie AG) was applied on both sides of the material. Subsequently, the material was folded six times in the MD direction to reduce the length from 24 cm to 4 cm. The folded structure was then clamped on both ends while the top clamps contained the electrical connections to both of the electrodes. The bottom clamps contained a weight of 100 g to remove any residual wrinkles in the composite. The electrodes were then connected to a high voltage power supply. At a voltage of 1500 V, an actuation strain of 0.76 mm (average over 5 samples) was detected. When calculating the expected actuation by taking the Young's Modulus of the elastomeric material (0.42 MPa) and a permittivity of approximately 3.0 estimating an isotropic material, a difference of the measured value to the calculated value of 19% was recognized. It was concluded that this improvement was achieved due to the anisotropic properties of the material that was made in this Example.

For testing the dielectric composite in sensor applications, a life time study was conducted. Sensors were prepared by using the dielectric composite and applying an electrode material (ELASTOSIL® LR3162, Wacker Chemie AG). 5 layers of dielectric composite were used for each sensor. While applying a cyclic strain of a minimum of 17% and a maximum of 54%, the capacitance was measured. After 700,000 cycles, a small nick with a depth of 1 mm was made into the sensors to test the tear growth properties. The sensors survived more than 100,000 cycles after the nick was put into the sensors (then failure occurred) compared to non reinforced dielectric composites, which failed more quickly (at about 100 cycles). It was concluded that the reinforcement layer prohibits rapid failure after applying any defect.

The disclosure may be further defined by the following numbered statements:

1. A dielectric composite comprising:
   a compacted porous membrane;
   an elastomer material at least partially penetrating said compacted porous membrane; and
   an electrically conductive material positioned on said elastomer layer.
2. The composite of statement 1, wherein said dielectric composite has a thickness less than about 100 µm.
3. The composite of any preceding statement, wherein said compacted porous membrane is transversely compacted, compacted in the machine direction, or both.
4. The composite of any preceding statement, wherein said elastomer material comprises a member selected from silicones, fluorosilicones, fluoroelastomers, polyurethanes, nitrile rubber, neoprene rubber, natural rubber, butyl rubber and acrylics.
5. The composite of any preceding statement, wherein said electrically conductive material comprises a member selected from an electrically conductive metal, an electrically conductive polymer, electrically conductive inks, carbon black particles and graphite particles.
6. The composite of any preceding statement, wherein said elastomer material has a thickness from about 0.1 µm to about 100 µm.
7. The composite of any preceding statement, wherein said electrically conductive material has a thickness from about 1 nm to about 20 µm.
8. The composite of any preceding statement, wherein said compacted porous membrane has a thickness from about 0.1 µm to about 50 µm.
9. The composite of any preceding statement, wherein said compacted porous membrane comprises a compacted expanded polytetrafluorethylene membrane.
10. The composite of any preceding statement, wherein said compacted porous membrane comprises an expanded polytetrafluoroethylene (ePTFE) membrane, an expanded modified PTFE membrane, expanded copolymers of PTFE, an expanded polyethylene membrane, a porous polypropylene membrane, an electrospun nanofiber membrane and combinations thereof.
11. The composite of any preceding statement in a stacked configuration.
12. The composite of any preceding statement in a wound configuration.
13. A dielectric composite comprising:
    a compacted porous membrane;
    an electrically conductive material positioned on said compacted porous membrane, and
    an elastomer material encompassing said electrically conductive material and at least partially penetrating said compacted porous membrane.
14. The composite of statement 13, wherein said dielectric composite has a thickness less than about 100 µm.
15. The composite of any one of statements 13 and 14, wherein said compacted porous membrane is transversely compacted, compacted in the machine direction, or both.
16. The composite of any one of statements 13 to 15, wherein said elastomer material comprises a member selected from silicones, fluorosilicones, polyurethanes, nitrile rubber, neoprene rubber, natural rubber, butyl rubber and acrylics.
17. The composite of any one of statements 13 to 16, wherein said electrically conductive material comprises a member selected from an electrically conductive metal, an electrically conductive polymer, electrically conductive inks, carbon black particles and graphite particles.
18. The composite of any one of statements 13 to 17, wherein said elastomer material has a thickness from about 0.1 µm to about 100 µm.

19. The composite of any one of statements 13 to 18, wherein said electrically conductive material has a thickness from about 1 nm to about 20 µm.
20. The composite of any one of statements 13 to 19, wherein said compacted porous membrane has a thickness from about 0.1 µm to about 50 µm.
21. The composite of any one of statements 13 to 20, wherein said compacted porous membrane comprises a compacted expanded polytetrafluoroethylene membrane.
22. The composite of any one of statements 13 to 21, wherein said compacted porous membrane comprises an expanded polytetrafluoroethylene (ePTFE) membrane, an expanded modified PTFE membrane, expanded copolymers of PTFE, an expanded polyethylene membrane, a porous polypropylene membrane, an electrospun nanofiber membrane and combinations thereof.
23. The composite of any one of statements 13 to 22 in a stacked configuration.
24. The composite of any one of statements 13 to 22 in a wound configuration.
25. A dielectric composite comprising:
a compacted porous membrane having a first side and a second side;
a first elastomer material positioned on said first side of said compacted porous membrane;
a second elastomer material positioned on said second side of said compacted porous membrane;
a first electrically conductive material positioned on said first elastomer layer opposing said compacted porous membrane; and
a second electrically conductive material positioned on said second elastomer layer opposing said compacted porous membrane.
26. The composite of statement 25, wherein said dielectric composite has a thickness less than about 100 µm.
27. The composite of any one of statements 25 and 26, wherein said compacted porous membrane is transversely compacted, compacted in the machine direction, or both.
28. The composite of any one of statements 25 to 27, wherein said first and second elastomer materials comprise a member selected from silicones, fluorosilicones, fluoroelastomers, polyurethanes, nitrile rubber, neoprene rubber, natural rubber, butyl rubber and acrylics.
29. The composite of any one of statements 25 to 28, wherein said first and second electrically conductive materials comprise a member selected from an electrically conductive metal, an electrically conductive polymer, electrically conductive inks, carbon black particles and graphite particles.
30. The composite of any one of statements 25 to 29, wherein each said first and second elastomer material has a thickness from about 0.1 µm to about 100 µm.
31. The composite of any one of statements 25 to 30, wherein each said first and second electrically conductive material has a thickness from about 1 nm to about 20 µm.
32. The composite of any one of statements 25 to 31, wherein said compacted porous membrane has a thickness from about 0.1 µm to about 50 µm.
33. The composite of any one of statements 25 to 32, wherein said compacted porous membrane comprises a compacted expanded polytetrafluoroethylene membrane.
34. The composite of any one of statements 25 to 33, wherein said compacted porous membrane comprises an expanded polytetrafluoroethylene (ePTFE) membrane, an expanded modified PTFE membrane, expanded copolymers of PTFE, an expanded polyethylene membrane, a porous polypropylene membrane, an electrospun nanofiber membrane and combinations thereof.
35. A method of making a dielectric composite comprising:
compacting a porous membrane;
applying an elastomer material to a first surface of said compacted porous membrane such that said elastomer material at least partially penetrates said first surface of said compacted porous membrane; and
positioning an electrically conductive material on a second surface of said elastomer material opposing said porous membrane.
36. The method of statement 35, wherein said compacted porous membrane is transversely compacted, compacted in the machine direction, or both.
37. The method of any one of statements 35 to 36, wherein said dielectric composite has a thickness less than about 100 µm.
38. The method of any one of statements 35 to 37, wherein said compacted porous membrane comprises an expanded polytetrafluoroethylene (ePTFE) membrane, an expanded modified PTFE membrane, expanded copolymers of PTFE, an expanded polyethylene membrane, a porous polypropylene membrane, an electrospun nanofiber membrane and combinations thereof.
39. The method of any one of statements 35 to 38, wherein said compacted porous membrane comprises a compacted expanded polytetrafluoroethylene membrane.
40. The method of any one of statements 35 to 39, wherein said compacted porous membrane has a thickness from about 0.1 µm to about 50 µm.
41. The method of any one of statements 35 to 40, wherein said electrically conductive material comprises a member selected from an electrically conductive metal, an electrically conductive polymer, electrically conductive inks, carbon black particles and graphite particles.
42. The method of any one of statements 35 to 41, wherein said electrically conductive material has a thickness from about 1 nm to about 20 µm.
43. The method of any one of statements 35 to 42, wherein said elastomer material has a thickness from about 1 µm to about 100 µm.
44. A method of making a dielectric composite comprising:
compacting a porous membrane;
applying a first elastomer material to a first side of said compacted porous membrane;
applying a second elastomer material to a second side of said compacted porous membrane,
positioning a first electrically conductive material on said first elastomer material opposing said compacted porous membrane; and
positioning a second electrically conductive material on said second elastomer material opposing said compacted porous membrane.
45. The method of statement 44, wherein said compacted porous membrane comprises an expanded polytetrafluoroethylene (ePTFE) membrane, an expanded modified PTFE membrane, expanded copolymers of PTFE, an expanded polyethylene membrane, a porous polypropylene membrane, an electrospun nanofiber membrane and combinations thereof.

46. The method of any one of statements 44 to 45, wherein said compacted porous membrane comprises a compacted expanded polytetrafluoroethylene membrane.

47. The method of any one of statements 44 to 46, wherein said compacted porous membrane has a thickness from about 0.1 µm to about 50 µm.

48. The method of any one of statements 44 to 47, wherein said electrically conductive material comprises a member selected from an electrically conductive metal, an electrically conductive polymer, electrically conductive inks, carbon black particles and graphite particles.

49. The method of any one of statements 44 to 48, wherein said electrically conductive material has a thickness from about 1 nm to about 20 µm.

50. The method of any one of statements 44 to 49, wherein said elastomer material has a thickness from about 1 µm to about 100 µm.

51. The method of any one of statements 44 to 50, wherein said dielectric composite has a thickness less than about 100 µm.

52. The method of any one of statements 44 to 51, wherein said compacted porous membrane is transversely compacted, compacted in the machine direction, or both.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A dielectric composite comprising:
    a compacted porous membrane;
        wherein the compacted porous membrane comprises macro-structured folds, micro-folded fibrils, or both macro-structured folds and micro-folded fibrils;
        wherein the compacted porous membrane comprises an expanded polytetrafluoroethylene (ePTFE) membrane, an expanded modified PTFE membrane, expanded copolymers of PTFE, an expanded polyethylene membrane, a porous polypropylene membrane, an electrospun nanofiber membrane and combinations thereof;
    an elastomer layer positioned on a surface of the compacted porous membrane and at least partially penetrating the compacted porous membrane;
        wherein the elastomer layer comprises a member selected from silicones, fluorosilicones, fluoroelastomers, polyurethanes, nitrile rubber, neoprene rubber, natural rubber, butyl rubber and acrylics; and
    an electrically conductive layer positioned on a surface of the elastomer layer;
        wherein the electrically conductive layer comprises an electrically conductive material; and
        wherein the electrically conductive material of the electrically conductive layer penetrates through a partial thickness of the elastomer layer.

2. The dielectric composite of claim 1, wherein the dielectric composite has a total thickness less than about 170 µm.

3. The dielectric composite of claim 1, wherein the compacted porous membrane is compacted in a transverse direction, compacted in a machine direction, or compacted in both the transverse direction and the machine direction.

4. The composite of claim 1, wherein the electrically conductive material comprises a member selected from an electrically conductive metal, an electrically conductive polymer, electrically conductive inks, carbon black particles, graphite particles and combinations thereof.

5. The dielectric composite of claim 1, wherein the elastomer layer has a thickness from about 0.1 µm to about 100 µm, wherein the electrically conductive material has a thickness from about 1 nm to about 20 µm, and wherein the compacted porous membrane has a thickness from about 0.1 µm to about 50 µm.

6. The dielectric composite of claim 1, wherein the compacted porous membrane comprises a compacted expanded polytetrafluorethylene membrane.

7. The dielectric composite of claim 1 in a stacked configuration.

8. The dielectric composite of claim 1 in a wound configuration.

* * * * *